US010760983B2

(12) United States Patent
Biesheuvel et al.

(10) Patent No.: US 10,760,983 B2
(45) Date of Patent: Sep. 1, 2020

(54) FLOOR CONTACT SENSOR SYSTEM AND METHODS FOR USING SAME

(71) Applicant: Sencorables LLC, Greenville, SC (US)

(72) Inventors: Willem Biesheuvel, Greenville, SC (US); Andrew C. Clark, Simpsonville, SC (US)

(73) Assignee: Sencorables LLC, Greenville, SC (US)

( * ) Notice: Subject to any disclaimer, the term of this patent is extended or adjusted under 35 U.S.C. 154(b) by 70 days.

(21) Appl. No.: 15/757,679

(22) PCT Filed: Sep. 15, 2016

(86) PCT No.: PCT/US2016/051885
§ 371 (c)(1),
(2) Date: Mar. 6, 2018

(87) PCT Pub. No.: WO2017/048921
PCT Pub. Date: Mar. 23, 2017

(65) Prior Publication Data
US 2018/0348073 A1  Dec. 6, 2018

Related U.S. Application Data

(60) Provisional application No. 62/218,844, filed on Sep. 15, 2015.

(51) Int. Cl.
*G01L 1/20* (2006.01)
*G01G 3/14* (2006.01)
(Continued)

(52) U.S. Cl.
CPC ............. *G01L 1/205* (2013.01); *G01G 3/14* (2013.01); *G01G 19/44* (2013.01); *G01L 1/18* (2013.01);
(Continued)

(58) Field of Classification Search
CPC ......... G01L 1/205; G01L 1/18; G01L 1/2287; G01G 3/14; G01G 19/44; G01G 23/3735; A61B 5/1036
See application file for complete search history.

(56) References Cited

U.S. PATENT DOCUMENTS 4,145,317 A  3/1979  Sado
4,273,682 A  6/1981  Kanamori
(Continued)

FOREIGN PATENT DOCUMENTS

EP  2062529  5/2009
FR  2780139  12/1999
(Continued)

OTHER PUBLICATIONS

Clark, Andrew C.; Final Office Action for U.S. Appl. No. 14/475,100, filed Sep. 2, 2014, dated Aug. 22, 2016; 18 pgs.
(Continued)

*Primary Examiner* — Harshad R Patel
*Assistant Examiner* — Nigel H Plumb
(74) *Attorney, Agent, or Firm* — Taylor English Duma LLP

(57) ABSTRACT

Disclosed herein is a floor contact sensor system having a data acquisition terminal and a sensor sheet assembly having at least one sensor sheet. Each sensor sheet has a base sheet and selected spaced conductive portions extending upwardly therefrom that are in communication with the data acquisition terminal. The conductive portions are a composite material formed of a polymer and a conductive filler such that the conductive portions can have physical characteristics essentially identical to the polymer, while being electrically conductive with the electrical resistance proportional to the load on the sensor. The floor contact sensor system can
(Continued)

be configured to provide real time dynamic contact information for overlying flooring materials during use.

25 Claims, 12 Drawing Sheets

(51) Int. Cl.
    *G01G 19/44*     (2006.01)
    *G01L 1/22*     (2006.01)
    *G01L 1/18*     (2006.01)
    *G01G 23/37*     (2006.01)

(52) U.S. Cl.
    CPC ........ *G01L 1/2287* (2013.01); *G01G 23/3735* (2013.01)

(56) References Cited

U.S. PATENT DOCUMENTS

| | | | |
|---|---|---|---|
| 4,302,361 A | 11/1981 | Kotani | |
| 4,314,227 A | 2/1982 | Eventoff | |
| 4,334,542 A | 6/1982 | Takinishi et al. | |
| 4,394,773 A | 7/1983 | Ruell | |
| 4,489,302 A | 12/1984 | Eventoff | |
| 4,492,949 A | 1/1985 | Peterson | |
| 4,495,236 A | 1/1985 | Obara | |
| 4,553,837 A | 11/1985 | Marcus | |
| 4,634,623 A | 1/1987 | Watkins | |
| 4,734,034 A | 3/1988 | Maness | |
| 4,856,993 A | 8/1989 | Maness | |
| 5,033,291 A | 7/1991 | Podoloff | |
| 5,042,504 A | 8/1991 | Huberti | |
| 5,060,527 A | 10/1991 | Burgess | |
| 5,083,573 A | 1/1992 | Arms | |
| 5,113,512 A | 5/1992 | Miki et al. | |
| 5,197,488 A | 3/1993 | Kovacevic | |
| 5,278,703 A | 1/1994 | Rub et al. | |
| 5,302,936 A | 4/1994 | Yaniger | |
| 5,360,016 A | 11/1994 | Kovacevic | |
| 5,422,061 A | 6/1995 | Takahaski | |
| 5,470,354 A | 11/1995 | Hershberger | |
| 5,541,570 A | 7/1996 | McDowell | |
| 5,583,630 A | 12/1996 | Kimura et al. | |
| 5,603,002 A | 2/1997 | Hashimoto | |
| 5,719,098 A | 2/1998 | Hahn et al. | |
| 5,756,904 A | 5/1998 | Oreper | |
| 5,818,956 A | 10/1998 | Tuli | |
| 5,880,976 A | 3/1999 | Digioia | |
| 5,887,199 A | 3/1999 | Ofer et al. | |
| 5,989,700 A | 11/1999 | Krivopal | |
| 5,993,400 A | 11/1999 | Rincoe et al. | |
| 5,997,829 A | 12/1999 | Sekine et al. | |
| 6,032,542 A | 3/2000 | Warnick | |
| 6,073,497 A | 6/2000 | Jiang | |
| 6,136,412 A | 10/2000 | Spiewak | |
| 6,155,120 A | 12/2000 | Taylor | |
| 6,207,775 B1 | 3/2001 | Marti | |
| 6,216,545 B1 | 4/2001 | Taylor | |
| 6,267,011 B1 | 7/2001 | Kurtz | |
| 6,273,863 B1 | 8/2001 | Avni | |
| 6,283,829 B1 | 9/2001 | Molnar | |
| 6,319,293 B1 | 11/2001 | Debe | |
| 6,363,796 B1 | 4/2002 | Jiang | |
| 6,441,084 B1 | 8/2002 | Lee | |
| 6,447,448 B1 | 9/2002 | Ishikawa | |
| 6,520,030 B1 | 2/2003 | Jiang | |
| 6,524,742 B1 | 2/2003 | Emanuel | |
| 6,539,815 B1 | 4/2003 | Jiang | |
| 6,543,299 B2 | 4/2003 | Taylor | |
| 6,561,044 B1 | 5/2003 | Jiang | |
| 6,583,630 B2 | 6/2003 | Mendes | |
| 6,668,304 B1 | 12/2003 | Satran et al. | |
| 6,684,717 B2 | 2/2004 | Jiang | |
| 6,693,441 B2 | 2/2004 | Lane | |
| 6,769,313 B2 | 8/2004 | Weiss | |
| 6,820,502 B2 | 11/2004 | Jiang | |
| 6,877,385 B2 | 4/2005 | Fang | |
| 6,993,400 B2 | 1/2006 | Viassolo | |
| 7,039,758 B2 | 5/2006 | Mannen et al. | |
| 7,080,562 B2 | 7/2006 | Knowles | |
| 7,097,662 B2 | 8/2006 | Evans | |
| 7,128,736 B1 | 10/2006 | Abrams | |
| 7,162,322 B2 | 1/2007 | Arbogast | |
| 7,258,026 B2 | 8/2007 | Papakostas | |
| 7,311,009 B2 | 12/2007 | Kotovsky | |
| 7,316,167 B2 | 1/2008 | Deconde | |
| 7,377,944 B2 | 5/2008 | Janusson | |
| 7,406,386 B2 | 7/2008 | Brett | |
| 7,430,925 B2 | 10/2008 | Son | |
| 7,437,953 B2 | 10/2008 | Deconde | |
| 7,470,288 B2 | 12/2008 | Dietz | |
| 7,770,473 B2 | 8/2010 | Von Lilienfeld-Toal | |
| 7,849,751 B2 | 12/2010 | Clark | |
| 7,926,365 B2 | 4/2011 | Yeh et al. | |
| 8,234,929 B2 | 8/2012 | Clark et al. | |
| 8,820,173 B2 | 9/2014 | Clark | |
| 9,095,275 B2 | 8/2015 | Clark | |
| 2001/0045104 A1 | 11/2001 | Bailey, Jr. et al. | |
| 2001/0052267 A1 | 12/2001 | Jiang et al. | |
| 2002/0059276 A1 | 5/2002 | Wei Loon et al. | |
| 2003/0069644 A1 | 4/2003 | Kovacevic et al. | |
| 2003/0115970 A1 | 6/2003 | Jiang et al. | |
| 2004/0019382 A1 | 1/2004 | Amirouche et al. | |
| 2004/0019384 A1 | 1/2004 | Kirking | |
| 2004/0064191 A1 | 4/2004 | Wasielewski | |
| 2004/0119701 A1 | 6/2004 | Mulligan et al. | |
| 2005/0010302 A1 | 1/2005 | Dietz et al. | |
| 2005/0177170 A1 | 8/2005 | Fisher | |
| 2005/0241409 A1 | 11/2005 | Taylor | |
| 2005/0273170 A1 | 12/2005 | Navarro et al. | |
| 2006/0047283 A1 | 3/2006 | Evans et al. | |
| 2006/0184067 A1 | 8/2006 | Clark | |
| 2006/0282006 A1 | 12/2006 | Petrucelli | |
| 2006/0282634 A1 | 12/2006 | Ohtsuka | |
| 2007/0234819 A1 | 10/2007 | Amirouche et al. | |
| 2008/0065225 A1 | 3/2008 | Wasielewski et al. | |
| 2010/0130889 A1 | 5/2010 | Toth et al. | |
| 2011/0121840 A1 | 5/2011 | Sanghera et al. | |
| 2011/0138932 A1 | 6/2011 | Clark et al. | |
| 2012/0068759 A1 | 3/2012 | Clark et al. | |
| 2012/0118649 A1 | 5/2012 | Clark et al. | |
| 2012/0123716 A1 | 5/2012 | Clark | |
| 2012/0234105 A1 | 9/2012 | Taylor | |
| 2013/0204157 A1 | 8/2013 | Clark et al. | |
| 2015/0201886 A1 | 7/2015 | Clark | |
| 2017/0196515 A1 | 7/2017 | Clark | |

FOREIGN PATENT DOCUMENTS

| | | |
|---|---|---|
| GB | 2427923 | 1/2007 |
| WO | 2010102309 | 9/2010 |
| WO | 2010141742 | 12/2010 |
| WO | 2011127306 | 10/2011 |
| WO | 2017048921 | 3/2017 |

OTHER PUBLICATIONS

Clark, Andrew C.; Non-Final Office Action for U.S. Appl. No. 14/475,100, filed Sep. 2, 2014, dated Mar. 9, 2016, 24 pgs.

Clark, Andrew C.; Restriction Requirement for U.S. Appl. No. 14/475,100, filed Sep. 2, 2014, dated Jun. 24, 2016, 5 pgs.

Clark, Andrew C.; Non-Final Office Action for U.S. Appl. No. 15/411,408, filed Jan. 20, 2017, dated Sep. 29, 2017, 28 pgs.

Clark, Andrew C.; Issue Notification for U.S. Appl. No. 13/376,037, filed Jan. 30, 2012, dated Jul. 15, 2015, 1 pg.

Clark, Andrew C.; Non-Final Office Action for U.S. Appl. No. 13/376,037, filed Jan. 30, 2012, dated Sep. 17, 2014, 16 pgs.

Clark, Andrew C.; Notice of Allowance for U.S. Appl. No. 13/376,037, filed Jan. 30, 2012, dated Apr. 6, 2015, 8 pgs.

Clark, Andrew C.; Final Office Action for U.S. Appl. No. 13/646,345, filed Oct. 5, 2012, dated May 23, 2014, 11 pgs.

Clark, Andrew C.; Non-Final Office Action for U.S. Appl. No. 13/646,345, filed Oct. 5, 2012, dated Dec. 2, 2013, 17 pgs.

(56) References Cited

OTHER PUBLICATIONS

Biesheuvel, Willem; International Search Report and Written Opinion for PCT Application No. PCT/US16/51885, filed Sep. 15, 2016, dated Dec. 8, 2016, 8 pgs.
Clark, Andrew; International Preliminary Report on Patentability for serial No. PCT/US2010/037285, filed Jun. 3, 2010, dated Jul. 27, 2010, 7 pgs.
Clark, Andrew; International Search Report and Written Opinion for serial No. PCT/US2010/037285, filed Jun. 3, 2010, dated Aug. 2, 2010, 9 pgs.
Clark, Andrew C.; International Preliminary Report on Patentability for serial No. PCT/US2011/031610, filed Apr. 7, 2011, dated Oct. 9, 2012, 10 pgs.
Clark, Andrew C.; International Search Report and Written Opinion for serial No. PCT/US2011/031610, filed Apr. 7, 2011, dated May 31, 2011, 13 pgs.
Biesheuvel, Willem; Provisional Patent Application entitled: Floor Contact Sensor System and Methods for Using Same having U.S. Appl. No. 62/218,844, filed Sep. 15, 2015, 53 pgs. (Copy not required—see MPEP § 609.04(a) (citing "Waiver of the Copy Requirement").).
Clark, Andrew; U.S. Provisional Application entitled: Contact Sensors and Methods for Making Same, having U.S. Appl. No. 61/157,963, filed Mar. 6, 2009, 29 pgs. (Copy not required—see MPEP § 609.04(a) (citing "Waiver of the Copy Requirement").).
Clark, Andrew; U.S. Provisional Application entitled: Implant Contact Sensors and Methods for Using Same, having U.S. Appl. No. 61/183,843, filed Jun. 3, 2009, 48 pgs. (Copy not required—see MPEP § 609.04(a) (citing "Waiver of the Copy Requirement").).
Clark, Andrew; U.S. Provisional Application entitled: Conductive Polymer Sensing Devices and Methods for Using Same, having U.S. Appl. No. 61/294,759, filed Jan. 13, 2010, 19 pgs. (Copy not required—see MPEP § 609.04(a) (citing "Waiver of the Copy Requirement").).
Clark, Andrew C.; U.S. Provisional Application entitled: Force/Pressure Sensor, having U.S. Appl. No. 61/321,734, filed Apr. 7, 2010, 50 pgs. (Copy not required—see MPEP § 609.04(a) (citing "Waiver of the Copy Requirement").).
Clark, Andrew C.; U.S. Provisional Application entitled: Contact Sensors and Methods for Making Same, having U.S. Appl. No. 61/371,920, filed Aug. 9, 2010, 76 pgs. (Copy not required—see MPEP § 609.04(a) (citing "Waiver of the Copy Requirement").).
Clark, Andrew C.; Issue Notification for U.S. Appl. No. 13/254,988, filed Nov. 11, 2011, dated Aug. 13, 2014, 1 pg.
Clark, Andrew C.; Non-Final Office Action for U.S. Appl. No. 13/254,988, filed Nov. 11, 2011, dated Dec. 28, 2012, 12 pgs.
Clark, Andrew C.; Non-Final Office Action for U.S. Appl. No. 13/254,988, filed Nov. 11, 2011, dated Sep. 25, 2013, 9 pgs.
Clark, Andrew C.; Notice of Allowance for U.S. Appl. No. 13/254,988, filed Nov. 11, 2011, dated Apr. 25, 2014, 9 pgs.
58-203, DuPont Material Safety Data Sheet. Original 2003. Available online Apr. 24, 2006. <http://www.customcoatingsinternational.com/958-203_051128_2_MSDS.pdf>, 1 pg.
Clark, AC; Article entitled: "Measurement of Dynamic Contact Area and Lubrication Modes in a Highly Conforming and a Standard Confirming Tibial Insert Using Polymeric Doping Technology", Transactions of the 51st Annual Meeting of the Orthopedic Research Society, vol. 30, 0568, Jan. 2005, 1 pg.
Clark, Andrew. Summer internship in the department of bioengineering at Clemson university. Poster Displayed Apr. 2001, 1 pg.
Clark, Andrew. Summer Internship. Available online Sep. 21, 2003, <http://web.archive.org/web/20030921125459/http://www.clemson.edu/agbioeng/bio/andrew.htm>, 1 pg.
Clark, Andrew C.; Examiner Interview Summary for U.S. Appl. No. 11/058,433, filed Feb. 15, 2005, dated Apr. 14, 2010, 3 pgs.
Clark, Andrew C.; Examiner Interview Summary for U.S. Appl. No. 11/058,433, filed Feb. 15, 2005, dated Sep. 15, 2010, 3 pgs.
Clark, Andrew C.; Final Office Action for U.S. Appl. No. 12/966,257, filed Dec. 13, 2010, dated Feb. 1, 2012, 7 pgs.
Clark, Andrew C.; Final Office Action for U.S. Appl. No. 11/058,433, filed Feb. 15, 2005, dated Aug. 9, 2010, 8 pgs.
Clark, Andrew C.; Interrnational Preliminary Report on Patentability for International Application No. PCT/2010/026576, filed on Mar. 8, 2010, dated Sep. 6, 2011, 5 pgs.
Clark, Andrew C.; International Search report and Written Opinion Ifor International Application No. PCT/US2010/026576, filed on Mar. 8, 2010, dated Jun. 17, 2010, 7 pgs.
Clark, Andrew C.; Issue Notification for U.S. Appl. No. 11/058,433, filed Feb. 15, 2005, dated Nov. 23, 2010, 1 pg.
Li, S., et al, "Current concepts review: ultra-high molecular weight polyethylene", The Journal of Bone and Joint Surgery, vol. 76-A, No. 7, pp. 1080-1090, 1994, 1 pg.
Clark, Andrew C.; Non-Final Office Action for U.S. Appl. No. 12/966,257, filed Dec. 13, 2010, dated Jun. 24, 2011, 7 pgs.
Clark, Andrew C.; Notice of Allowance for U.S. Appl. No. 12/966,257, filed Dec. 13, 2010, dated Apr. 3, 2012, 7 pgs.
Clark, Andrew C.; Notice of Allowance for U.S. Appl. No. 11/058,433, filed Feb. 15, 2005, dated Sep. 30, 2010, 6 pgs.
Paranis, et al.; Article entitled: "Analysis of the effect of pressure on compression moulding of UHMWPE", Journal of Materials Science: Materials in Medicine, vol. 9, pp. 1080-1090, 1998, 1 pg.
Clark, Andrew C.; Restriction Requirement for U.S. Appl. No. 11/058,433, filed Feb. 15, 2005, dated Feb. 1, 2010, 8 pgs.
Clark, Andrew C.; Restriction Requirement for U.S. Appl. No. 11/058,433, filed Feb. 15, 2005, dated Sep. 2, 2009, 7 pgs.
Biesheuvel, Willem; Extended European Search Report for serial No. 16847280.1, filed Sep. 15, 2016, dated Jun. 17, 2019, 10 pgs.

FLOOR CONTACT SENSOR SYSTEM AND METHODS FOR USING SAME

FIELD OF USE

This invention relates to a floor contact sensor system, and more particularly to a floor contact sensor system comprising a plurality of pressure sensors for accurately measuring surface contact data thereupon an upper floor surface.

RELATED ART

Contact sensors have been used to gather information concerning contact or near-contact between two surfaces in industrial applications, for example to determine load and uniformity of pressure between mating surfaces, in the development of bearings and gaskets, and the like. In general, these known contact sensors include pressure-sensitive films designed to be placed between mating surfaces. These film sensors, while generally suitable for examining static contact characteristics between two generally flat surfaces, have presented many difficulties in other situations. For example, film-based contact sensor devices and methods introduce a foreign material having some thickness between the mating surfaces, which can change the contact characteristic of the junction and overestimate the contact areas between the two surfaces. Moreover, the ability to examine real time, dynamic contact characteristics is practically non-existent with these types of sensors.

What are needed in the art are contact sensors that can provide more accurate and/or dynamic contact information concerning a junction formed between two surfaces of any surface shape.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, the present invention is directed to a contact sensor. The sensor includes an electrically conductive composite material comprising a polymer and a conductive filler. Generally, the composite material can include any polymer. In certain aspects, the polymer can be an engineering polymer or a high performance polymer. In one preferred aspect, the composite material can include ultra-high molecular weight polyethylene (UHMWPE). In one aspect, the composite material of the sensors can include between about 0.1% and 20% by weight of a conductive filler. The conductive filler can be any suitable material. For example, in one aspect, the conductive filler can include carbon black.

The contact sensors of the floor contact sensor system can define a contact surface. Optionally, a surface of the contact sensors of the can be formed to be substantially inflexible so as to replicate a surface that can be placed in proximity to a surface of a second member, thereby forming a junction. In particular, the contact sensors of the invention can form a floor contact sensor system that is configured to sense pressure that is applied to an upper surface of a flooring material.

In one aspect, the floor contact sensor system can comprise a data acquisition terminal that is in coupled communication with a sensor sheet assembly that underlies a flooring material. In one aspect, the sensor sheet assembly can comprise a pair of opposed sensor sheets. In this aspect, each sensor sheet can comprise a base sheet and selected spaced conductive portions extending upwardly therefrom the base sheet. It is contemplated that the spaced conductive portions can be selectively coupled or attached to the base sheet or the spaced conductive portions can be integrally formed with the base sheet. In a further aspect, the pair of sensor sheets can comprise an upper sensor sheet and a lower sensor sheet that are stacked vertically in opposition such that the respective base sheets of the pair of sensor sheets form a bottom surface and an upper surface. In opposition, portions of the opposed conductive portions therein the respective upper and lower sensor sheets overlap and create an array of sensing points at the overlapping and opposed conductive portions of the stacked sensor sheets. In another aspect, it is contemplated that the respective upper and lower sensor sheets can be positioned substantially parallel to each other.

In one aspect, each spaced conductive portion can be in electrical communication with the data acquisition terminal. In another aspect, the floor contact sensor system further can comprise means for determining the pressure applied at least one sensing point of the array of sensing points. In a further optional aspect, the means for determining the pressure applied at least one sensing point of the array of sensing points can be configured to sense pressure applied to an upper surface of the overlying flooring material.

In one aspect, the spaced conductive portions of the floor contact sensor system can be formed from a pressure sensitive conductive composite material that comprises an electrically conductive filler and a polymeric material. In one aspect, the spaced conductive portions can be formed entirely of the composite material. In another aspect, the contact sensors of the invention can include one or more discrete regions of the electrically conductive composite material and a non-conductive material. In one particular aspect, the intervening polymeric material separating discrete regions of the composite material can include the same polymer as the polymer of the electrically conductive composite material.

In another aspect, the sensor sheet assembly can comprise one or more sensing points. The sensing points can be configured to measure current flow therethrough the sensing point during application of a load. In one aspect, the current flow measured at each sensing point can be transmitted to a data acquisition terminal. In an additional aspect, the data acquisition terminal can transmit a digital output signal indicative of the current flow measurements to a computer having a processor. In a further aspect, the processor can be configured to calculate the load experienced at each respective sensing point using the digital output signal. In this aspect, the computer can be configured to graphically display the loads experienced at the sensing points as a pressure distribution graph. It is contemplated that the pressure distribution graph can be a three-dimensional plot or a two-dimensional intensity plot wherein various colors correspond to particular load values. It is further contemplated that the computer can be configured to display the pressure distribution graph substantially in real-time. In still a further aspect, the computer can be configured to store the load calculations for the plurality of sensing points for future analysis and graphical display.

In one aspect, the electrically conductive composite material can be located at the contact surface of the spaced conductive portions for obtaining surface contact data. If desired, the sensor can include composite material that can be confined within the sensor, at a depth below the contact surface, in order to obtain internal stress data.

The electrically conductive composite material described herein can, in one particular aspect, be formed by mixing a polymer in particulate form with a conductive filler in particulate form. According to this aspect, in order to completely coat the polymer granules with the granules of the conductive filler, the granule size of the polymer can be at least about two orders of magnitude larger than the granule size of the conductive filler.

Following a mixing step, the composite conductive material can be formed into the shape of the spaced conductive portions either with or without areas of non-conductive material in the sensor, as desired, by, for example, compression molding, RAM extrusion, or injection molding.

During use, the sensors of the floor contact sensor system can be positioned in association with a member so as to form a contact junction between opposing spaced conductive portions of the opposed sensor sheets. The spaced conductive portions of the opposed sensor sheets can then be placed in electrical communication with a data acquisition terminal, for example via a fixed or unfixed hard-wired or a wireless communication circuit, and data can be gathered concerning contact between the sensor and the member. In one particular aspect, dynamic contact data can be gathered. For example, any or all of contact stress data, internal stress data, load, impact data, and/or information concerning wear, such as wear mode information can be gathered.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the invention and together with the description, serve to explain various principles of the invention.

DETAILED DESCRIPTION

Figure 1:
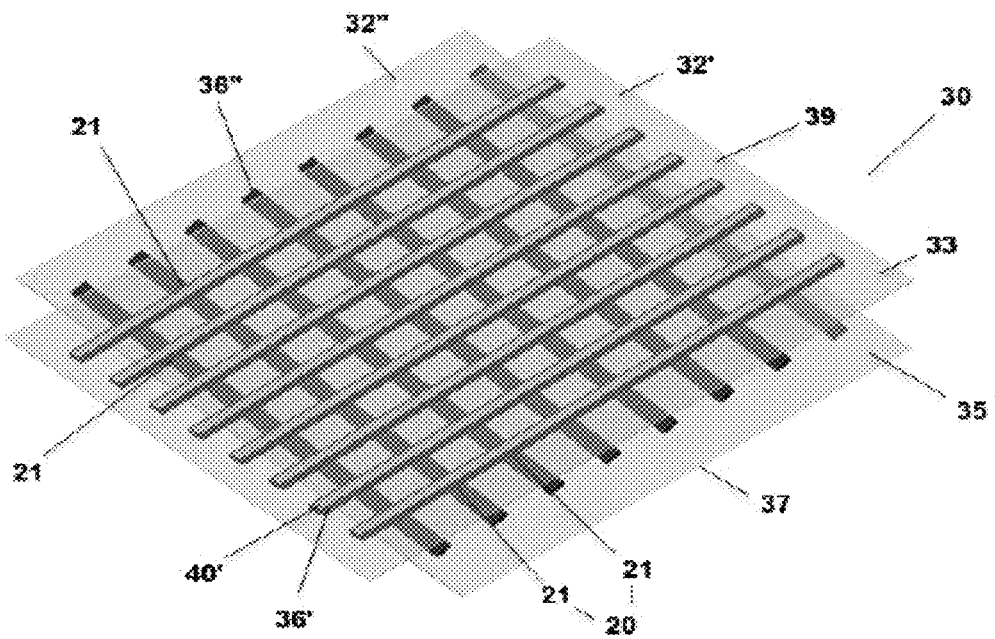
FIG. 1 is a perspective partially transparent view showing one aspect of a floor contact sensor system disclosed herein for obtaining pressure data of a junction, the floor contact sensor system showing two stacked sensor sheets, each sheet having a plurality of spaced conductive portions, the stacked sensor sheets being oriented substantially perpendicular to each other such that an array of sensing points is formed by the overlapping portions of the conductive portions of the stacked sensor sheets.

The present invention can be understood more readily by reference to the following detailed description, examples, and claims, and their previous and following description. Before the present system, devices, and/or methods are disclosed and described, it is to be understood that this invention is not limited to the specific systems, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. Those skilled in the relevant art will recognize that many changes can be made to the aspects described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "sensor" includes aspects having two or more sensors unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes examples where said event or circumstance occurs and examples where it does not.

For purposes of the present disclosure, the following terms are herein defined as follows:

The term "primary particle" is intended to refer to the smallest particle, generally spheroid, of a material such as carbon black.

The term "aggregate" is intended to refer to the smallest unit of a material, and in particular, of carbon black, found in a dispersion. Aggregates of carbon black are generally considered indivisible and are made up of multiple primary particles held together by strong attractive or physical forces.

The term "granule" is also intended to refer to the smallest unit of a material found in a dispersion. However, while a granule can also be an aggregate, such as when considering carbon black, this is not requirement of the term. For example, a single granule of a polymer, such as UHMWPE or conventional grade polyethylene, for example can be a single unit.

The term "agglomeration" is intended to refer to a configuration of a material including multiple aggregates or granules loosely held together, as with Van der Waals forces. Agglomerations of material in a dispersion can often be broken down into smaller aggregates or granules upon application of sufficient energy so as to overcome the attractive forces.

The term "conventional polymer" is intended to refer to polymers that have a thermal resistance below about 100° C. and relatively low physical properties. Examples include high-density polyethylene (PE), polystyrene (PS), polyvinyl chloride (PVC), and polypropylene (PP).

The term "engineering polymer" is intended to refer to polymers that have a thermal resistance between about 100° C. and about 150° C. and exhibit higher physical properties, such as strength and wear resistance, as compared to conventional polymers. The engineering polymers can comprise a non-elastomeric polymers with non-compressible or in-compressible surfaces. Conventionally, and as one skilled in the art will appreciate, these types of non-elastic polymers are often referred to as "hard polymers". Examples include polycarbonates (PC), polyamides (PA), polyethylene terephthalate (PET), and ultrahigh molecular weight polyethylene (UHMWPE). Optional exemplary engineering polymers can comprise, for example and without limitation, polyphenylene Sulfide (PPS), polymethyl methacrylate (PMMA), polycarbonate (PC), polycarbonate+polyethylene terephthalate (PC/PET), polycarbonate+acrylonitrile butadiene styrene (PC/ABS), polyamides (PA), polyphenylene oxides (PPO), acrylonitrile butadiene styrene (ABS), engineering thermoplastic vulcanizate (ETPV), polybutylene terephthalate (PBTP), polyethersulfone (VPES), polyethylenimine (PEI), phenylpropanolamine (PPA), hydroxyphenylpyruvic acid (HPPA), liquid-crystal polymers (LCP), phosphorus triiodide (PI), polysulfone (PSU), polyphenylene sulfone (PPSU), and the like.

The term "high performance polymer" is intended to refer to polymers that have a thermal resistance greater than about 150° C. and relatively high physical properties. Examples include polyetherether ketone (PEEK), polyether sulfone (PES), polyimides (PI), and liquid crystal polymers (LC).

Contact stress, synonymous with contact pressure, is herein defined as surface stress resulting from the mechanical interaction of two members. It is equivalent to the applied load (total force applied) divided by the area of contact.

Internal stress refers to the forces acting on an infinitely small unit area at any point within a material. Internal stress varies throughout a material and is dependent upon the geometry of the member as well as loading conditions and material properties.

Impact force is herein defined to refer to the time-dependent force one object exerts onto another object during a dynamic collision.

Presented herein are contact sensors, methods of forming contact sensors, and methods of advantageously utilizing the sensors. In general, contact sensors can be utilized to gather dynamic and/or static contact data at the junction of two opposing members such as a junction found in a coupling, a connection, or any other junction involving the mechanical interaction of two opposing members, and including junctions with either high or low tolerance values as well as junctions including intervening materials between the members. Dynamic and/or static data that can be gathered utilizing the disclosed sensors can include, for example, load data, contact stress data, internal stress data, and/or impact data for a member forming the junction. The contact sensors disclosed herein can provide extremely accurate data for the junction being examined.

In one aspect, and referring to FIGS. 1-10, a floor contact sensor system 10 (shown in FIG. 10) can comprise a data acquisition terminal 100 (shown in FIG. 10) that is in coupled communication with a sensor sheet assembly 30 that underlies a flooring material 2. In one aspect, the sensor sheet assembly 30 can comprise a pair of opposed sensor sheets 32. In this aspect, each sensor sheet 32 can comprise a base sheet 34 having selected spaced conductive portions 36 that are configured to extend upwardly therefrom the base sheet. In this aspect, and as detailed below, the conductive portion 36 of each sensor sheet 32 can formed from a pressure sensitive conductive composite material that comprises an electrically conductive filler and a polymeric material. In another aspect, it is contemplated that the selected spaced conductive portions 36 of each sensor sheet can be formed from a substantially inflexible composite material.

Optionally, it is contemplated that the spaced conductive portions 36 can be selectively coupled or attached to the base sheet 34 or the spaced conductive portions 35 can be integrally formed with the base sheet 34. In one aspect, the spaced conductive portions 36 can be conventionally attached to the base sheet 34, such as with, for example and without limitation, adhesive, ultrasonic welding, and the like.

In another aspect, it is contemplated that the base sheet 34 can be formed from a polymeric material and the base sheet 34 can be integrally formed with the selected spaced polymeric conductive portions. In this aspect, it is contemplated that the polymeric material forming the base sheet and spaced conductive portions can be the same. In a further aspect, it is contemplated that the base sheet 34 can be formed from a non-conductive material, for example and without limitation, a non-conductive polymeric material. In one aspect, each base sheet 34 can be formed from a moisture impervious material. Optionally, each base sheet 34 can be formed from a hydrophobic material.

Figure 2:
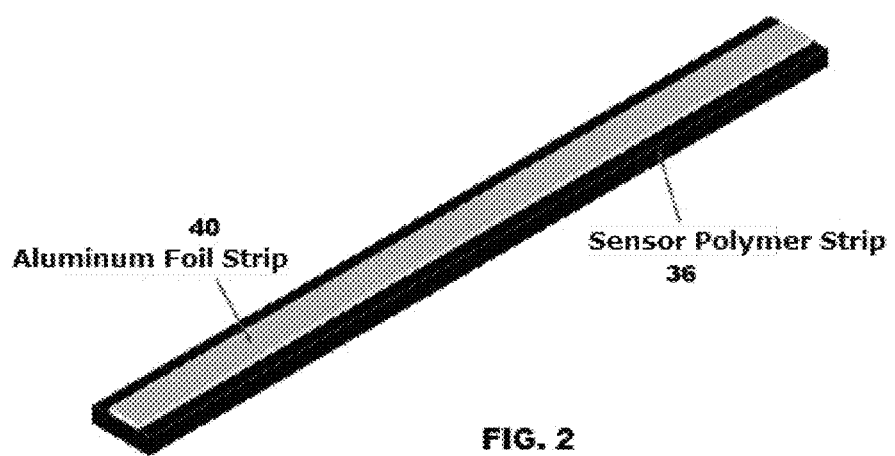
FIG. 2 is a perspective view of a polymeric conductive portion having a highly conductive material, such as aluminum foil, mounted to a service of the polymeric conductive portion to conduct a signal to a data acquisition terminal.
Figure 3:
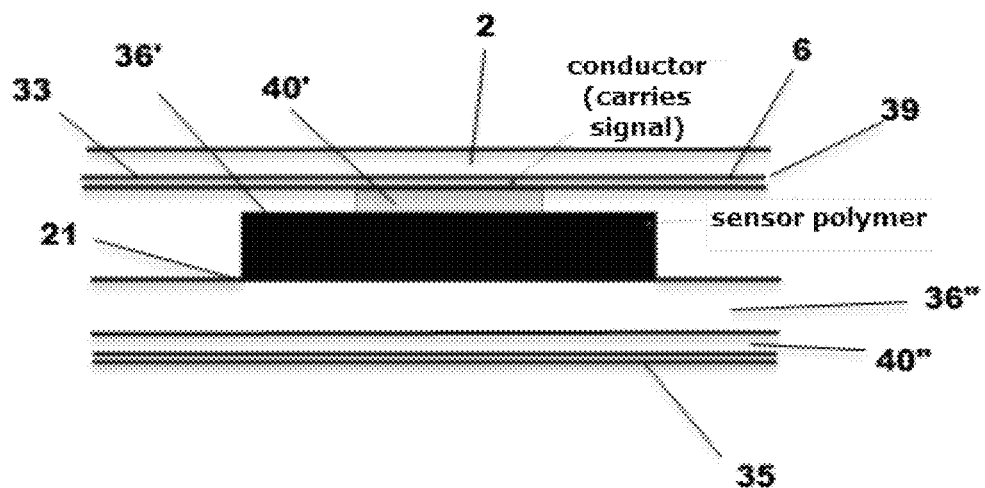
FIG. 3 an expanded elevational view of the floor contact sensor system shown in FIG. 1 for obtaining pressure data of a junction.

In one aspect, to provide for obtaining the best measurements over a large area, each conductive portion can comprise a highly conductive route for signals to travel to the data acquisition terminal 100. For example, and without limitation, such a conductive route can comprise, for example, a metallic wire or foil, highly conductive polymer, conductive textile (yarn), or other highly conductive material 40 that is positioned in contact with the less-conductive polymeric conductive portion 36. As shown in FIG. 2, one exemplary aspect can be to mount a strip of aluminum foil to the top, non-contact, surface of the polymeric conductive portion 36. As one skilled in the art will appreciate, the foil would sandwiched between the base sheet and the top surface of the polymeric conductive portion 36.

In another aspect, the pair of sensor sheets 32 comprises an upper sensor sheet 33 and a lower sensor sheet 35 that are stacked vertically in opposition such that the respective base sheets 34 of the pair of sensor sheets 32 form a composite structure having a bottom surface 37 and an upper surface 39. In this aspect, it is contemplated that portions of the opposed conductive portions 36 therein the sensor sheets 32 overlap and are in contact to create an array of sensing points 20 at the overlapping and opposed conductive portions of the stacked sensor sheets. In another aspect, it is contemplated that the respective upper and lower sensor sheets 33, 35 forming the composite structure can be positioned substantially parallel to each other.

Figure 10:
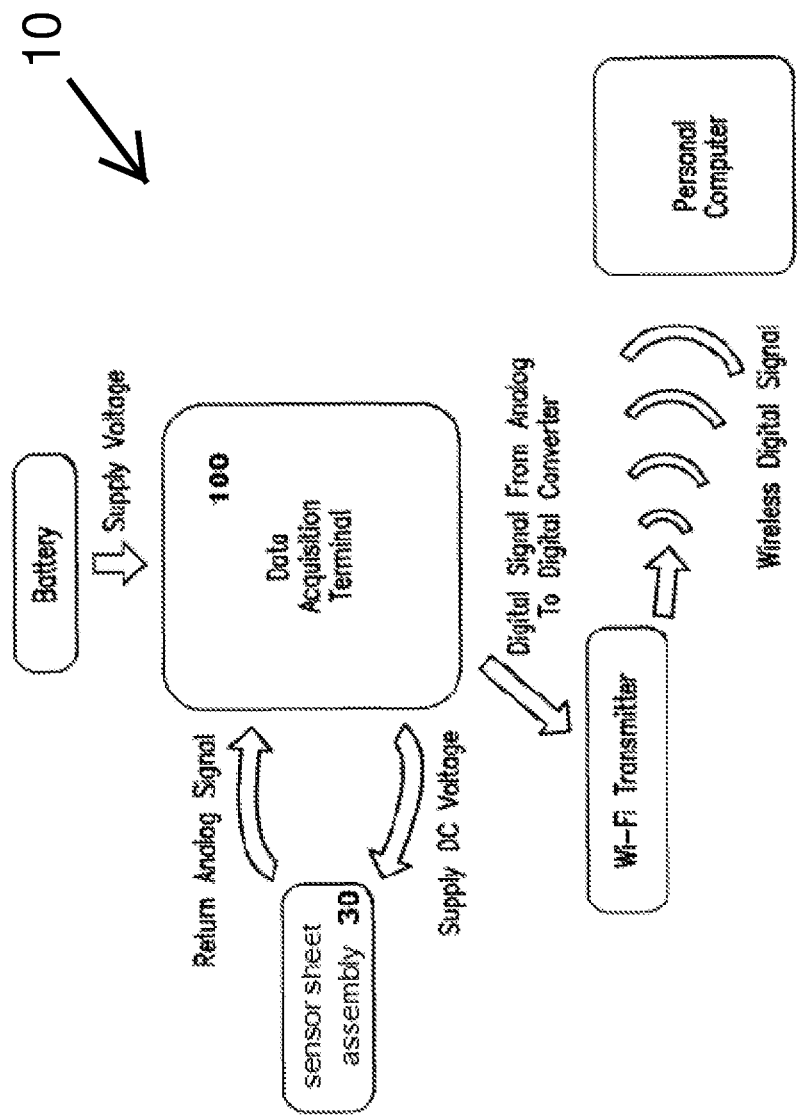
FIG. 10 is a schematic of a floor contact sensor system comprising a sensor sheet assembly in operative communication with a data acquisition terminal, and showing a battery operatively coupled to the data acquisition terminal and a computer coupled to the data acquisition terminal via a Wi-Fi transmitter.

In one aspect, each spaced conductive portion 36 can be in electrical communication with the data acquisition terminal 100. In another aspect, the floor contact sensor system 10 further can comprise means for determining the pressure applied at least one sensing point 21 of the array of sensing points 20. In a further optional aspect, the means for determining the pressure applied at least one sensing point 21 of the array of sensing points 20 can be configured to sense pressure applied to an upper surface 4 of the overlying flooring material 2. In this aspect, each spaced conductive portion 36 can be in communication with the data acquisition terminal 100 that can be programmed to determine the pressure applied at least one sensing point 21 of the array of sensing points 21. FIG. 10 provides an exemplary schematic of a floor contact sensor system 10 comprising a sensor sheet assembly 30 in operative communication with a data acquisition terminal 100, and showing a battery operatively coupled to the data acquisition terminal and a computer coupled to the data acquisition terminal via a Wi-Fi transmitter.

In one aspect, and as shown in FIGS. 1-9, the conductive portions 36 of each sensor sheet 32 can be formed as conductive "stripes" that extend the substantial length of the base sheet. In one aspect, the conductive portions 36 or stripes can be positioned substantially parallel to each other and to a longitudinal axis of the length of the base sheet. One will appreciate that, if the base sheet 34 is pliable, the sensor sheet 32 can be rolled up about its longitudinal axis for shipping and storage. In another aspect, the conductive "parallel" portions of one sensor sheet 32 can be oriented substantially perpendicular to the conductive portions of an adjacent, underlying sensor sheet 32 to form the desired array of sensing points 20.

In another aspect, the floor contact sensor system 10 can also comprise a flooring material 2 that has a lower surface 6 that is configured to be mounted on the upper surface 39 of the formed composite structure. In this aspect, the data acquisition terminal 100 can be programmed to determine the pressure applied to the upper surface 4 of the flooring material 2 via at least one sensing point 21 of the array of sensing points 21 that is configured to sense pressure. In this aspect, the data acquisition terminal 100 can be programmed to selectively connect one conductive portion 36 of an underlying lower sensor sheet 35 to a voltage source and one conductive portion 36 of the overlying upper sensor sheet 33 to a current-to-voltage circuit to measure the current through the sensing point 21 formed at the overlapping portions of the stacked sensor sheets 32. In another aspect, the data acquisition terminal 100 can be programmed to measure the current at each sensing point of the array of sensing points 21 and, subsequently, to process the current measurements of at least one sensing point to determine the pressure that is applied at each sensing point.

The conductive portions 36 of the floor contact sensor system 10 can define a contact surface. Optionally, a surface of one conductive portion 36 can be formed to be substantially inflexible so as to replicate a surface that can be placed in contact a second conductive portions 36, thereby forming a junction. In particular, the sensor sheet assembly can be configured to sense pressure that is applied to an upper surface of a flooring material.

One skilled in the art will appreciate that it is contemplated that, in order to get the best measurements over a large area, the floor contact sensor system 10 can define a highly conductive route for the signals to travel—such as a metallic wire or foil, highly conductive polymer, conductive textile (yarn), or other highly conductive material. This highly conductive material is preferably in contact with the less-conductive polymer sensor material. As illustrated, it is contemplated that the most economical and practical way to accomplish this will be to layer a strip of aluminum foil to act as a conductor on top of the polymer sensor material, which, for example and without limitation, can either be a strip of polymer sensor material or a solid sheet of polymer sensor material.

In another aspect, the sensor sheet assembly can comprise one or more sensing points. The sensing points can be configured to measure current flow therethrough the sensing point during application of a load. In one aspect, the current flow measured at each sensing point can be transmitted to a data acquisition terminal. In an additional aspect, the data acquisition terminal can transmit a digital output signal indicative of the current flow measurements to a computer having a processor. In a further aspect, the processor can be configured to calculate the load experienced at each respective sensing point using the digital output signal. In this aspect, the computer can be configured to graphically display the loads experienced at the sensing points as a pressure distribution graph. It is contemplated that the pressure distribution graph can be a three-dimensional plot or a two-dimensional intensity plot wherein various colors correspond to particular load values. It is further contemplated that the computer can be configured to display the pressure distribution graph substantially in real-time. In still a further aspect, the computer can be configured to store the load calculations for the plurality of sensing points for future analysis and graphical display.

In one aspect, the array of sensing points 21 can provide more detailed data such as, for example and without limitation, the array of sensing points can provide data describing the distribution of contact stresses and/or internal stresses, data concerning types of wear modes, or load and impact data. According to this aspect, it is contemplated the spaced conductive portions 36 can be located at predetermined, discrete locations to form a desired array of sensing points 21 in the floor contact sensor system 10. Data from the plurality of discrete sensing points 21 can then be correlated and analyzed and can provide information concerning, for example, the distribution of contact characteristics selected portions of the upper surface of the flooring material 2, and in particular can provide contact information under dynamic loading conditions across the surface overlying flooring material of the floor contact sensor system.

In one aspect, it is contemplated that the plurality of sensing points 21 can be formed in any desired configuration. For example, and without limitation, the sensing points can be positioned in a series of parallel rows as shown. Alternatively, the formed sensing points 21 can be positioned in staggered configurations. In one aspect, the formed sensing points 21 can be substantially evenly spaced. In another aspect, the formed sensing points can be substantially unevenly spaced.

In another aspect, it is contemplated that selected sensing points 21 among the plurality of sensing points can be activated during the application of a load while the remainder of the sensing points remain deactivated.

In one aspect, because the conductive composite material of the conductive portions 36 can provide electrical communication between the sensing points 21 at the contact surfaces of the conductive portions 36, the conductive composite material of each conductive portion can have a bulk resistance. In this aspect, the bulk resistance can be measured in Ohms per unit length; accordingly, as the length of the conductive portion increases, the bulk resistance proportionally increases. Therefore, the bulk resistance of the conductive composite material can vary from one sensing point to another sensing point. It is contemplated that the farther a particular sensing point is from an electrical connection between the conductive portion and the data acquisition terminal, the greater the bulk resistance will be at that particular sensing point. Consequently, it is contemplated that the resistance measured at each sensing point can be different even when the change in resistance at some sensing points is identical. In addition, it is contemplated that the sensing points can always have at least some level of electrical communication with adjacent sensing points, even when a load is not being applied. Thus, when a load is applied to one or more sensing points, the sensing points that are subjected to the load can generate current within sensing points that are not subjected to the load (parallel resistance paths).

In one exemplary aspect, during installation, two layers of the subflooring material with attached polymeric conductive portions can be installed, with the overlying sensor sheet 33 being positioned at a desired angle, such as, for example and without limitation, at 90 degrees relative to the underlying sensor sheet 35 such that conductive portions 36 of sensor sheet 33 cross-over the conductive portions 36 of sensor sheet 35 in a perpendicular manner. As described above, in this configuration, with the respective conductive portions 36 of sensor sheets 33 and 35 facing one another such that the respective conductive portions 36 of sensor sheets 33 and 35 touch, the array of sensing points 20 or junctions is formed. It is contemplated that the overlying sensor sheet 33 can also be placed at other desired angles relative to the underlying sensor sheet 35, especially if room geometries would necessitate doing so. In this aspect, as long as the top and bottom strips overlap at certain points, an array of sensing points or junctions will be formed by each overlapping point.

Figure 4:
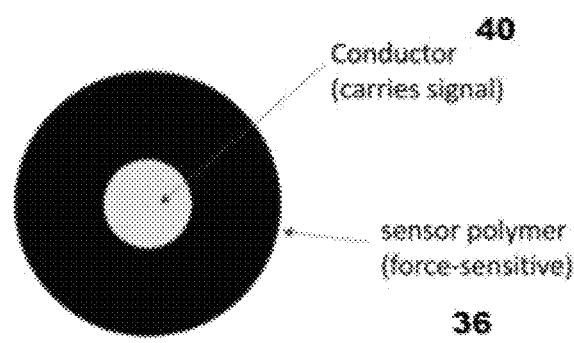
FIG. 4 is a cross-sectional view of a polymeric conductive portion surrounding a highly conductive material that is configured to conduct a signal to a data acquisition terminal.
Figure 5:
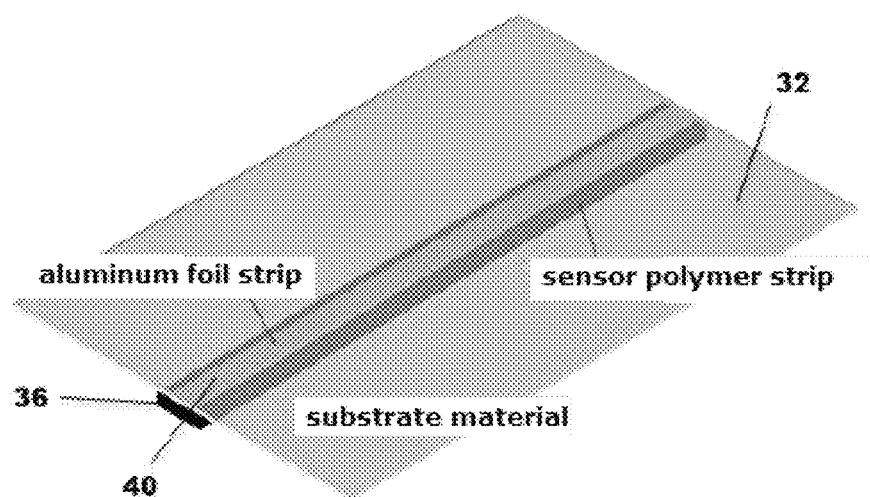
FIG. 5 is a perspective view of a polymeric conductive portion having a highly conductive material mounted to a service of the polymeric conductive portion to conduct a signal to a data acquisition terminal and showing the polymeric conductive portion and highly conductive material coupled to the underside of a base sheet.
Figure 6:
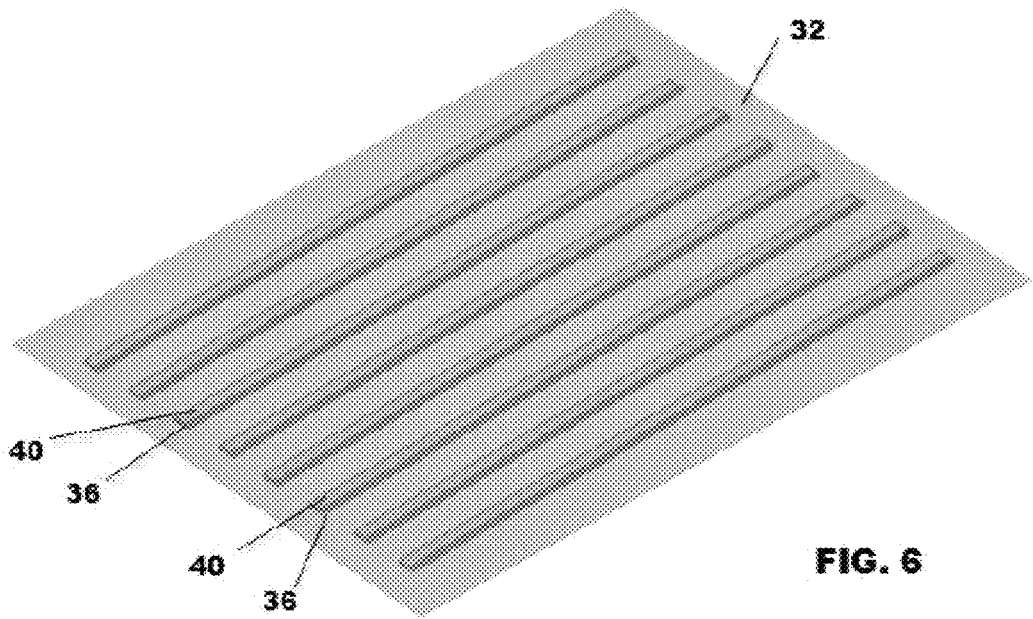
FIG. 6 is a perspective view showing a plurality of the polymeric conductive portion/highly conductive material assembly coupled mounted to the underside of a base sheet.
Figure 7:
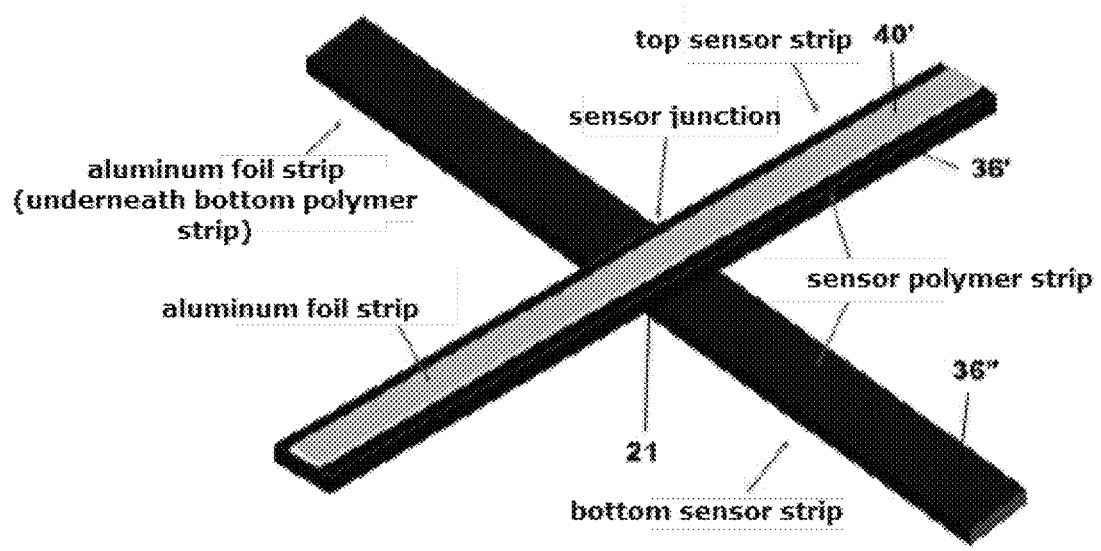
FIG. 7 is a perspective view showing a pair of opposing polymeric conductive portion/highly conductive material assembly configured such that the polymeric conductive portions of the sensor assemblies are in contact and form a sensor point.

Optionally, and using the polymeric conductive portion shown in FIG. 4, in which the polymeric conductive portion 36 surrounds the highly conductive portion 40, the respective cross-overs can be exemplarily obtained by simply overlying the conductive portions as outlined above, or the spaced polymeric conductive portions can be woven together, using conventional weaving techniques to create the desired array of sensing points 21.

In one aspect, it is contemplated that the polymeric conductive portions 36 can have a width, relative to the longitudinal axis of the base sheet, ranging from between about ⅛ inches to 1 inch, more preferably from about ⅜ inches to ¾ inches, and most preferably about ½ inches. In another aspect, the polymeric conductive portions 36 can have a width greater than 1 inch. In this aspect, as the sensor strips become wider, material costs increase, but the likelihood of missing a small pressure point due to lack of sensor material in a certain location decreases. When not considering material costs, the polymeric conductive portions 36 would preferably be just slightly less wide than the spacing between adjacent individual polymeric conductive portions 36.

Optionally, it is contemplated that different types of flooring can be reflected in different polymeric conductive portions 36 widths and/or spacing. Also, to increase the reliability of the system, the highly conductive material 40 needs to be narrower than the less conductive sensor polymer strips. This will help ensure that the highly conductive material 40 of the respective upper and lower sensor sheets do not directly contact one another, which would bypass the sensor junction (electrically "shorting out" the junction), giving it a non-variable, low resistance. In this aspect, it is contemplated that the conductive portions 36 of the sensor sheets can have a thickness ranging from between about 0.001 inches to about 0.010 inches, more preferably from between about 0.003 inches to about 0.006 inches, and most preferably about 0.0045 inches. In a further aspect, it is contemplated that the highly conductive material 40 can have a thickness ranging from between about 0.00025 inches to about 0.003 inches, and more preferably from between about 0.0005 inches to about 0.001 inches.

In one aspect, it is contemplated that each formed sensing point 21 can provide a signal that is indicative of the amount of force detected at the respective sensing point 21. In another aspect, readings from the array of sensing points can be obtained at a desired frequency, such as for example and without limitation, at a frequency rate between about 1 Hz to 60 Hz, which allows for the tracking of multiple objects (either static objects, such as chairs, trolleys, baby strollers and the like and/or movable objects, such as people, animals and the like) on a floor at any given point in time. In one aspect, it is contemplated that the floor sensor system can be reset to a zero point after fixed furniture pieces are placed into position on the floor. Thus, such an option, would be capable of tracking pressure changes from the zero point.

One skilled in the art will appreciate that the spacing of the conductive portions 36 can determine how many sensing points 21 are contained in a given area of flooring. In one exemplary aspect, in order to obtain a desired balance between functionality and system cost, at least one sensor point 21 can be provided for the area of the floor equivalent to the area of an average male person. One would appreciate that, if the conductive portions 36 are spaced too far apart, a person, animal, or moving object might step somewhere on the floor where no sensing points 21 detect them, or a chair (or other furniture) might not be detected at some places on the floor. In this aspect, wider conductive portions 36 can be used to ensure that no person's step, or object's point of weight application is missed.

In another aspect, because different flooring materials have different thicknesses and stiffnesses, it is contemplated that the required density of the sensing points 21 in the floor sensor system 10 can be different for different flooring materials. It is anticipated that a carpeted floor will require the most closely spaced conductive portions 36, whereas a tile floor can have conductive portions that are spaced much further apart.

In order to account for the bulk resistance of the composite material forming the conduction portions and the parallel resistance paths described herein, the processor of the computer disclosed herein can be programmed to accurately determine the actual change in contact resistance experienced at each sensing point of the floor contact sensor system 10 based on the digital output signal received from the A/D converter of the data acquisition terminal. In one aspect, the processor can be configured to calculate contact resistance changes at individual sensing points based on the current measurements at each respective sensing point. In this aspect, the processor can calculate the resistance changes as the solution to a series of non-linear equations that describe the load in terms of the current measurements at each respective sensing point. It is contemplated that the processor can be configured to solve the series of simultaneous non-linear equations using one or more conventional algorithms, including, for example and without limitation, the "Newton-Raphson method" and the "node analysis" method. The contact resistance changes calculated by the processor can then be used to determine the actual applied load at each respective sensing point. In one aspect, it is contemplated that the conductive paths produced by the plurality of sensing points can vary depending on the spatial arrangement of the sensing points.

The surface area and geometry of any individual sensing point 21 as well as the overall geometric arrangement of the array of sensing points 20 over the surface of the sensor sheet assembly, can be predetermined as desired. For example, through the formation and distribution of smaller sensing points 21 with less intervening space between individual sensing points 21, the spatial resolution of the data can be improved. While there may be a theoretical physical limit to the minimum size of a single sensing point determined by the size of a single polymer granule, practically speaking, the minimum size of the individual sensing points will only be limited by modern machining and electrical connection forming techniques. In addition, increased numbers of data points can complicate the correlation and analysis of the data. As such, the preferred geometry and size of the multiple sensing points can generally involve a compromise between the spatial resolution obtained and complication of formation methods.

In use, it is contemplated that the pair of sensor sheets can be thermoformed in substantially identical three-dimensional sizes and orientations. In one aspect, the sensor sheets 32 can be placed in a stacked relationship with adjacent sensor sheets. In this aspect, it is contemplated that no fusing between adjacent sensor sheets will occur. For example, and without limitation, the conductive portions 36 of one sensor sheet can be oriented substantially perpendicularly to the conductive portions of an adjacent sensor sheet prior to stacking of the sensor sheets. It is contemplated that upon application of a load to the sensor sheets, each respective sensor sheet can function as an electrode such that no additional contact with a conductive element is required to produce current therethrough the sensors sheets. It is further contemplated the overlap between the conductive portions of the sensor sheets can create cross points for measuring loads applied to the sensor sheets.

Figure 12:
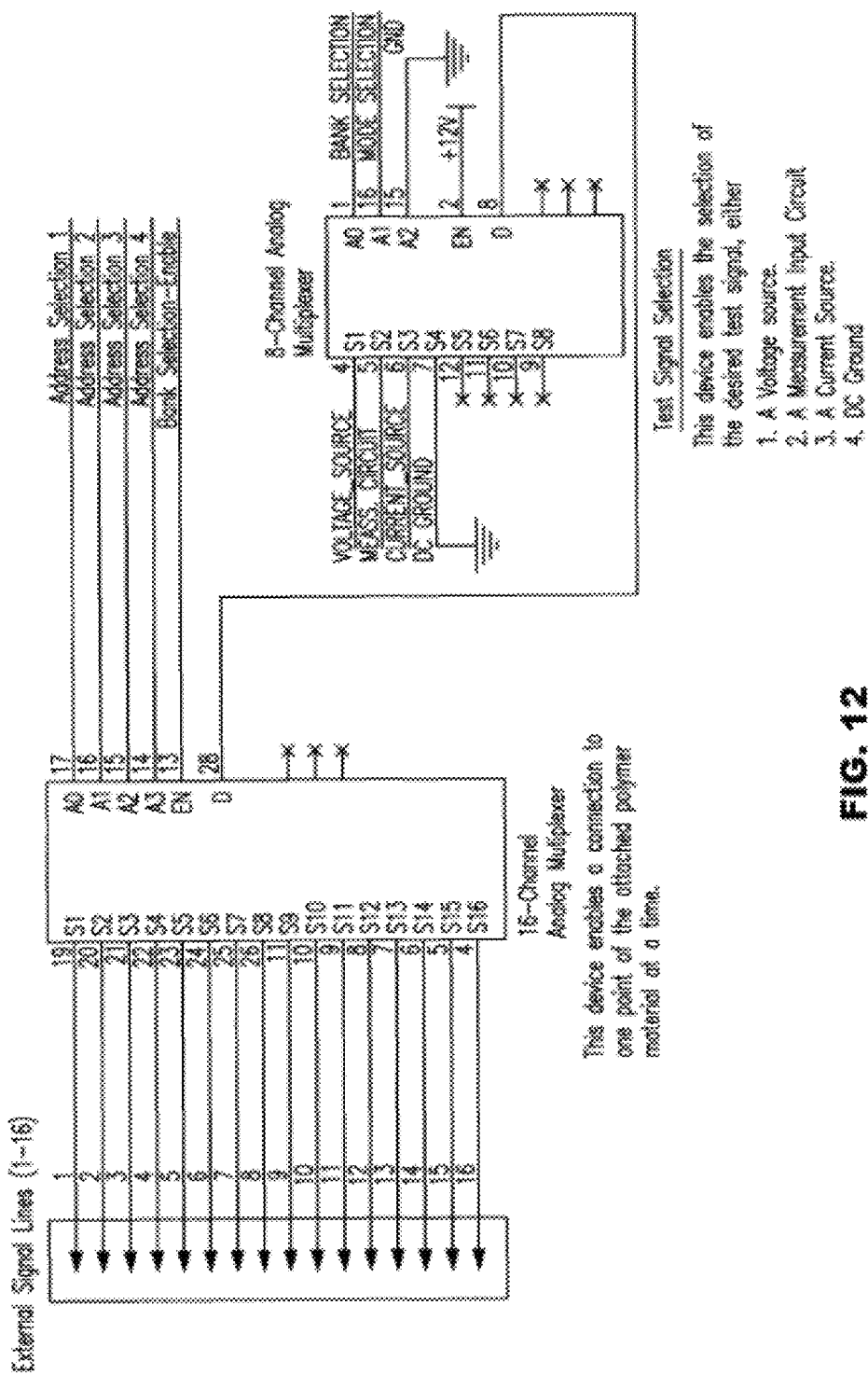
FIG. 12 is a schematic of an exemplary interface circuitry for the data acquisition terminal.

In one exemplary aspect, each sensor sheet 32 has a plurality of conductive portions of conductive material that are positioned in substantial parallel relationship. In the illustrated example, the vertical conductive portions on one sheet 32, "columns," and the horizontal conductive portions on the underlying sheet, "rows," are positioned relative to each other so that, at the places where these columns and rows spatially intersect, the conductive areas of the two sheets are in physical and electrical contact with each other. In one aspect, the exemplary interface electronics illustrated in FIG. 12 can be used with appropriate control software within the data acquisition terminal 100 to connect one "column" to a voltage source and one "row" to a current-to-voltage circuit, in order to measure the current through the conductive polymer materials. In one aspect, it is contemplated that each column/row pair, i.e., the internal junction sensing points 21, can be measured, one at a time, to provide a complete set of current measurements. As illustrated, and not meant to be limiting, the stacked sensor sheets being oriented substantially perpendicular to each other allow for the formation of the array of sensing points 20 by the overlapping portions of the conductive portions 36 of the stacked sensor sheets.

Figure 13A:
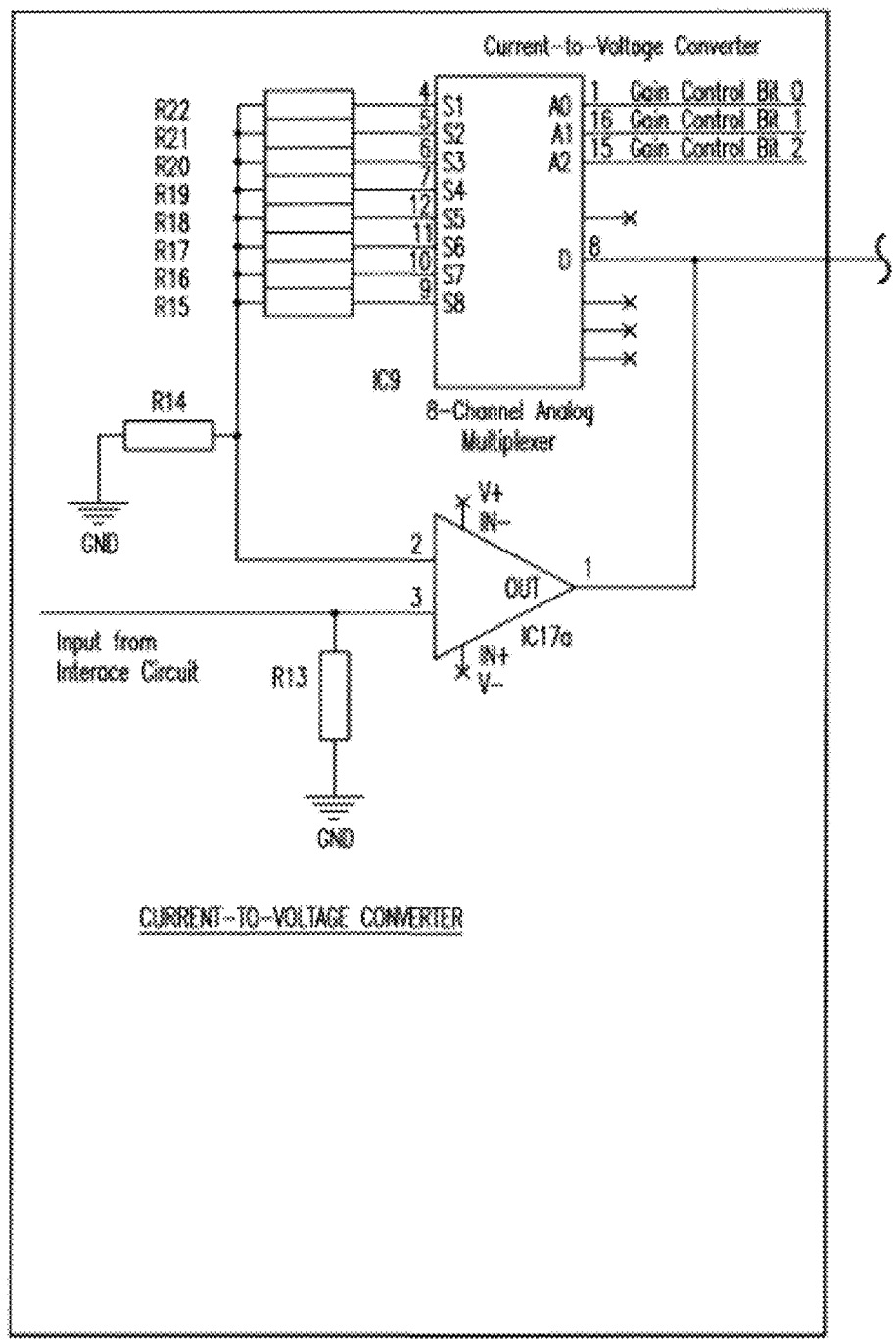
FIGS. 13 A-C are schematic illustrations of an exemplary measurement circuitry for the data acquisition terminal.
Figure 13B:
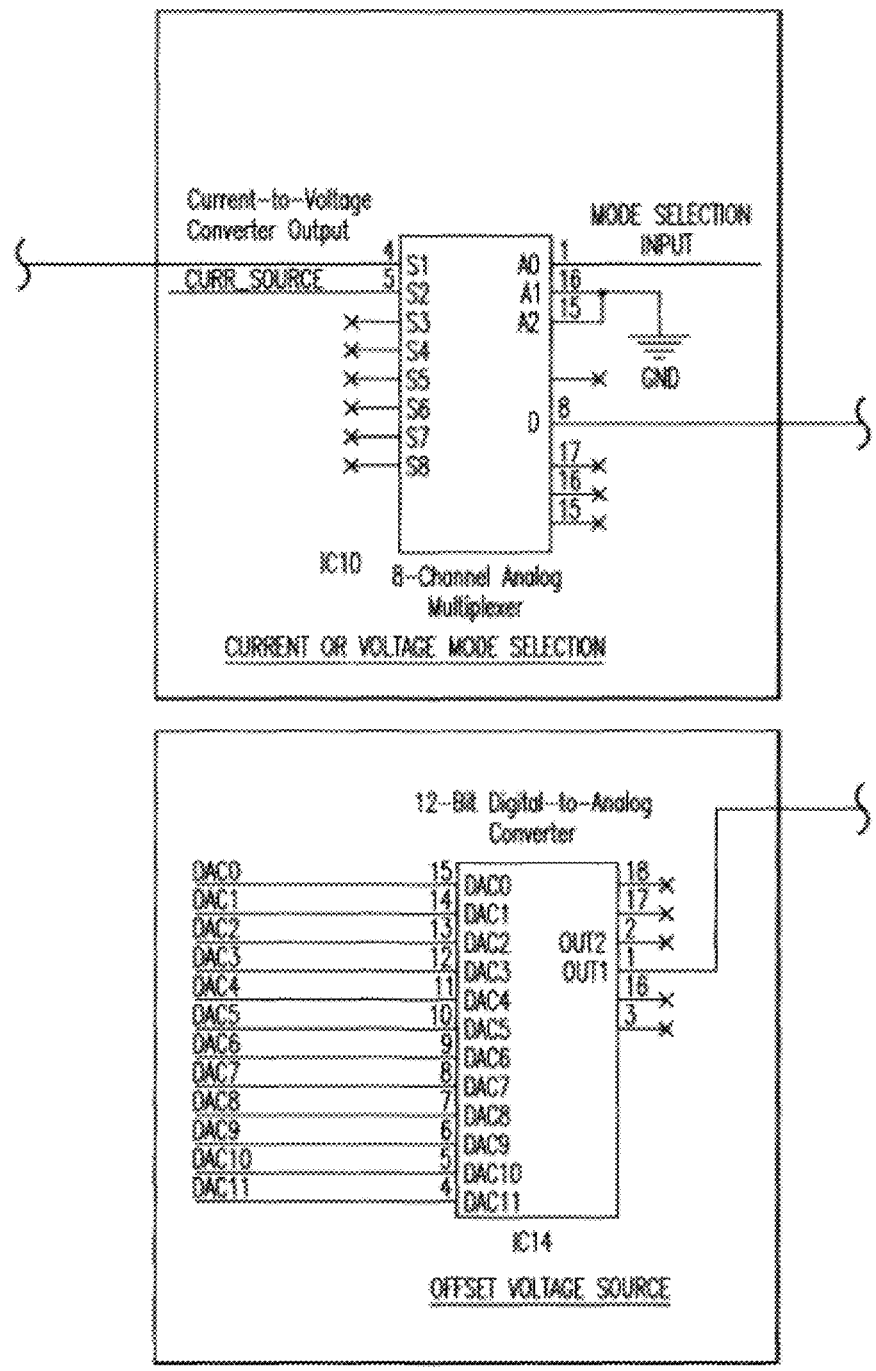
Figure 13C:
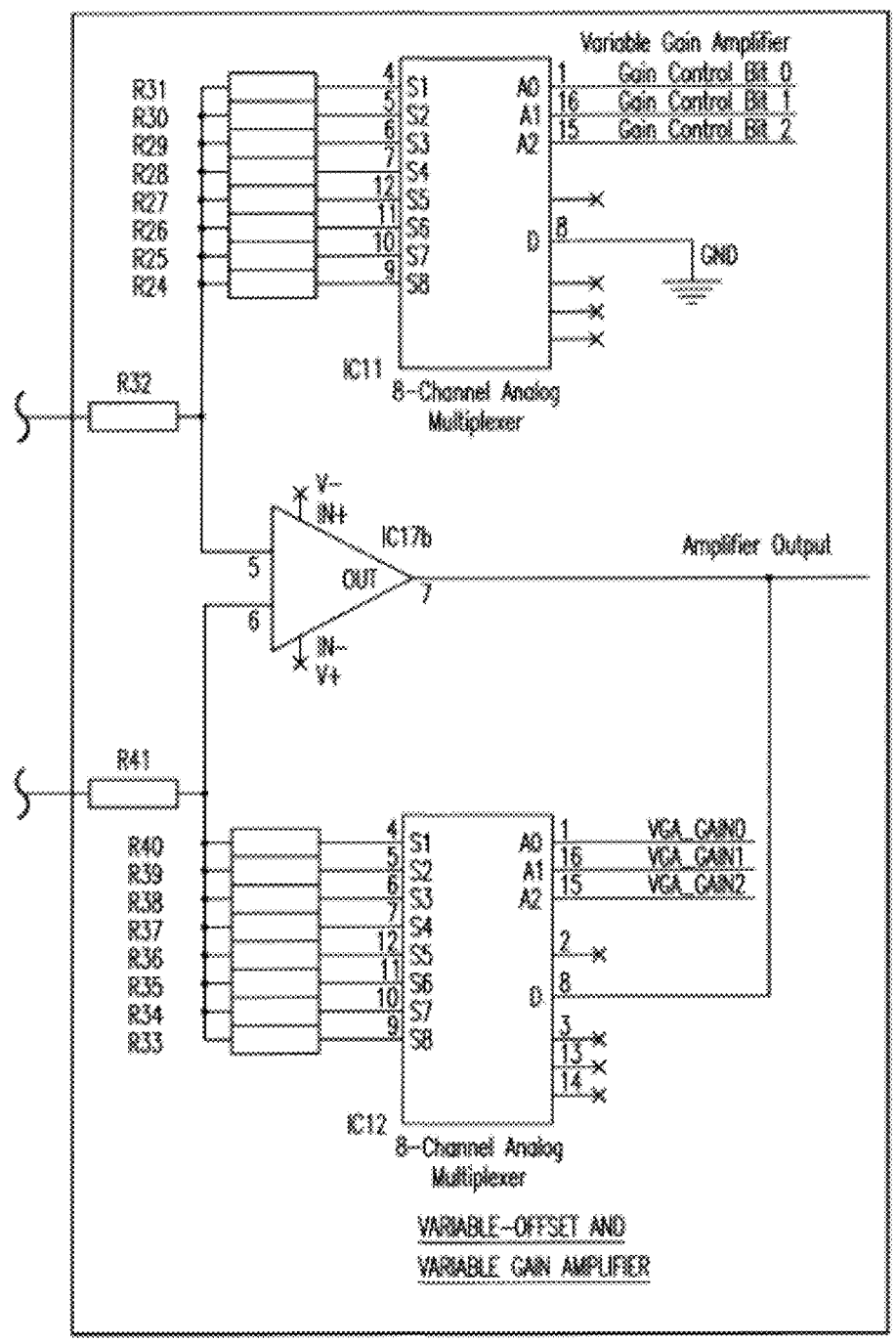

In one aspect, these current measurements do not represent the currents at the pressure-sensitive sensing points 21 in the stacked polymer sheets where the conductive portions 36 overlap. Rather, the current measurements are actually external measurements at external points (also called "nodes"), which are generally near the outer edges of the material. The measurement data are processed in software within the data acquisition terminal 100 in order to calculate the individual currents that are present at each measurement point where the columns and rows overlap, and then this information is used to determine the pressure that is applied at each measurement point. An exemplary, non-limiting, schematic of the measurement circuitry is provided in FIGS. 13A-C herein. In yet another aspect, it is contemplated that both subsurface contact data and surface contact data can be gathered from a single sensor through combination of the above-described aspects.

In another aspect, calibration of the each conductive portion may be desired as each individual sensor can have individually unique electrical properties that must be calibrated to a standard in order to achieve a desired degree of load measurement accuracy. Further, it is believed that the individual conductive portions can experience hysteresis when the sensor assembly is unloaded. Thus, it is contemplated that conventional signal processing components configured to correlate the voltage or current to the load of the respective conductive portion can be implemented using software configured to correlate the load during loading and load during unloading. To compensate for the observed hysteresis effect, it is also contemplated that the software can be configured to calculate the load during a static position—when the load is substantially constant—by using a mean point between a calculated load value during loading and a calculated load value during unloading.

In one aspect, the base sheet 34 and the conductive portions 36 of each sensor sheet 32 can define a plurality of troughs 39 that extend the substantial length of the base sheet. In one aspect, the plurality of troughs can be positioned substantially parallel to each other and to the longitudinal axis of the length of the base sheet 34. In this aspect, the floor contact sensor system 10 can also comprise at least one elongate tube 50 and a source of pressurized fluid 52 that is in fluid communication with the elongate tube. In this aspect, the elongate tube 50 can be mountable therein the plurality of troughs of a select sensor sheet 32 along a desired serpentine path that can extend, as desired, along a desired portion of the plurality of troughs. In this aspect, the data acquisition terminal 100 can be programmed to regulate a recirculation rate and/or the desired temperature of the pressurized fluid being supplied to the elongate tube.

In one aspect, the spaced conductive portions 36 of the floor contact sensor system 10 can be formed from a pressure sensitive conductive composite material that comprises at least one non-conductive polymer material combined with an electrically conductive filler. In another aspect, the composite material disclosed herein can comprise an electrically conductive filler that can provide pressure sensitive electrical conductivity to the composite material, but can do so while maintaining the physical characteristics, e.g., wear resistance, hardness, etc., of the non-conductive polymeric material of the composite.

In one aspect, the spaced conductive portions 36 can be formed entirely of the composite material. In another aspect, the sensor assembly 30 of the invention can include one or more discrete regions of the electrically conductive composite material and a non-conductive material. In one particular aspect, the intervening polymeric material separating discrete regions of the composite material can include the same polymer as the polymer of the electrically conductive composite material.

In one aspect, the composite material can include any polymer. In one aspect, the composite material can comprise engineering polymers, and more particularly, can comprise a non-elastomeric polymers with non-compressible or incompressible surfaces. Conventionally, and as one skilled in the art will appreciate, these types of non-elastic polymers are often referred to as "hard polymers", in that these non-elastic polymers are harder than "soft polymers"', with soft polymers comprising elastomers, other rubber-like polymers and the like.

In certain aspects, the polymer can be an engineering polymer or a high performance polymer. In one preferred aspect, the composite material can include ultra-high molecular weight polyethylene (UHMWPE). In one aspect, the composite material of the sensors can include between about 0.1% and 20% by weight of a conductive filler. The conductive filler can be any suitable material. For example and not meant to be limiting, in one aspect, the conductive filler can include carbon black. For example, the disclosed sensors can provide contact data for the junction without the necessity of including extraneous testing material, such as dyes, thin films, or the like, within the junction itself. In one aspect, the conductive portions 36 can comprise a thermoformable polymer, such as, for example and without limitation, ultra high molecular weight polyethylene (UHMWPE), high density polyethylene (HDPE), polyphenolyne sulfide (PPS), low density polyethylene (LDPE), polyoxymethylene copolymer (POM), and the like. Optional exemplary engineering polymers can comprise, for example and without limitation, polyphenylene sulfide (PPS), polymethyl methacrylate (PMMA), polycarbonate (PC), polycarbonate+ polyethylene terephthalate (PC/PET), polycarbonate+acrylonitrile butadiene styrene (PC/ABS), polyethylene terephthalate (PET), polyamides (PA), polyphenylene oxides (PPO), acrylonitrile butadiene styrene (ABS), engineering thermoplastic vulcanizate (ETPV), polybutylene terephthalate (PBTP), polyethersulfone (VPES), polyethylenimine (PEI), phenylpropanolamine (PPA), hydroxyphenylpyruvic acid (HPPA), liquid-crystal polymers (LCP), polyether ether ketone (PEEK), phosphorus triiodide (PI), polysulfone (PSU), polyphenylene sulfone (PPSU), and the like.

In an additional aspect, the spaced conductive portions of the floor contact sensor system disclosed herein can be formed to be substantially inflexible. In this aspect, it is contemplated that the spaced conductive portions can be thermoformed as desired into a three-dimensional shape. In one aspect, it is contemplated that the desired shape of the spaced conductive portions can be a substantially rectangular in cross-section. Optionally, the spaced conductive portions can be formed is a substantially planar sheet with non-conductive portions interposed between the spaced conductive portions.

This combination of beneficial characteristics in the composite materials has been attained through recognition and/or development of processes for forming the composite materials in which only a small amount of the electrically conductive filler need be combined with the polymeric material. It should be noted, however, that while the presently disclosed sensors can be of great benefit when formed to include engineering and/or high performance polymeric composite materials, this is not a requirement of the invention. In other aspects, the polymer utilized to form the composite material can be a more conventional polymer. No matter what polymer, copolymer, or combination of polymers is used to form the disclosed composite conductive materials, the composite materials of the disclosed sensors can exhibit pressure sensitive electrical conductivity and if desired, can also be formed so as to essentially maintain the physical characteristics of a polymeric material identical to the composite but for the lack of the conductive filler.

In general, any polymeric material that can be combined with an electrically conductive filler to form a pressure sensitive conductive polymeric composite material that can then be formed into an essentially inflexible shape can be utilized in the contact sensors described herein. For example, various polyolefins, polyurethanes, polyester resins, epoxy resins, and the like can be utilized in the contact sensors described herein. In certain aspects, the composite material can include engineering and/or high performance polymeric materials. In one particular aspect, the composite material can include UHMWPE. UHMWPE is generally classified as an engineering polymer, and possesses a unique combination of physical and mechanical properties that allows it to perform extremely well in rigorous wear conditions. In fact, it has the highest known impact strength of any thermoplastic presently made, and is highly resistant to abrasion, with a very low coefficient of friction.

Conductive fillers as are generally known in the art can be combined with the polymeric material of choice to form the composite material of the disclosed sensors. The conductive fillers can be, for example and without limitation, carbon black and other known carbons, gold, silver, aluminum, copper, chromium, nickel, platinum, tungsten, titanium, iron, zinc, lead, molybdenum, selenium, indium, bismuth, tin, magnesium, manganese, cobalt, titanium germanium, mercury, and the like. According to one aspect, a pressure sensitive conductive composite material can be formed by combining a relatively small amount of a conductive filler with a polymeric material. For example, the composite can comprise from between about 0.1% to about 20% by weight of the conductive filler, more preferably from between about 1% to about 15% by weight of the conductive filler, and most preferably from between about 5% to about 12% by weight of the conductive filler. Of course, in other aspects, such as those in which the physical characteristics of the composite material need not approach those of the non-conductive polymeric material, the composite material can include a higher weight percentage of the conductive filler material.

In general, the polymeric material and the conductive filler can be combined in any suitable fashion, which can generally be determined at least in part according to the characteristics of the polymeric material. For example, and depending upon the polymers involved, the materials can be combined by mixing at a temperature above the melting temperature of the polymer (conventional melt-mixing) and the filler materials can be added to the molten polymer, for example, in a conventional screw extruder, paddle blender, ribbon blender, or any other conventional melt-mixing device. The materials can also be combined by mixing the materials in an appropriate solvent for the polymer (conventional solution-mixing or solvent-mixing) such that the polymer is in the aqueous state and the fillers can be added to the solution. Optionally, an appropriate surfactant can be added to the mixture of materials to permit or encourage evaporation of the solvent, resulting in the solid conductive composite material. In another aspect, the materials can be mixed below the melting point of the polymer and in dry form. In this aspect, the materials can be mixed by a standard vortex mixer, a paddle blender, a ribbon blender, or the like, such that the dry materials are mixed together before further processing.

When mixing the components of the composite material, the mixing can be carried out at any suitable conditions. For example, in one aspect, the components of the composite material can be mixed at ambient conditions. In other aspects, however, the components of the composite material can be mixed at non-ambient conditions. For example, the components of the composite material can be mixed under non-ambient conditions to, for example and without limitation, maintain the materials to be mixed in the desired physical state and/or to improve the mixing process.

When dry mixing the materials to be utilized in the composite, the exact particulate dimensions of the materials are not generally critical to the invention. However, in certain aspects, the relative particulate size of the materials to be combined in the mixture can be important. In particular, the relative particulate size of the materials to be combined can be important in those aspects wherein a relatively low amount of conductive filler is desired and in those aspects wherein the polymer granules do not completely fluidize during processing. For example, the relative particle size can be important in certain aspects wherein engineering or high-performance polymers are utilized. It is contemplated that the relative particle size can be particularly important during utilization of extremely high melt viscosity polymers such as UHMWPE, which can be converted via non-fluidizing conversion processes, including, for example and without limitation, compression molding or RAM extrusion processes.

In such aspects, the particle size of the filler can beneficially be considerably smaller than the particle size of the polymer. According to this aspect, and while not wishing to be bound by any particular theory, it is believed that due to the small size of the conductive filler particles relative to the larger polymer particles, the conductive filler is able to completely coat the polymer during mixing and, upon conversion of the composite polymeric powder in a non-fluidizing conversion process to the final solid form, the inter-particle distance of the conductive filler particles can remain above the percolation threshold such that the composite material can exhibit the desired electrical conductivity. According to this aspect, when forming the composite mixture, the granule or aggregate size of the conductive filler to be mixed with the polymer can be at least about two orders of magnitude smaller than the granule size of the polymer. In some aspects, the granule or aggregate size of the conductive filler can be at least about three orders of magnitude smaller than the granule size of the polymer.

In forming the composite material according to this aspect, a granular polymer can be dry mixed with a conductive filler that is also in particulate form. Readily available UHMWPE in general can have a granule diameter in a range of from about 50 microns to about 200 microns. Typically, the individual granule is made up of multiple sub-micron sized spheroids and nano-sized fibrils surrounded by varying amounts of free space.

In one aspect, the conductive filler for mixing with the polymer can comprise carbon black. Carbon black is readily available in a wide variety of agglomerate sizes, generally ranging in diameter from about 1 microns to about 100 microns that can be broken down into smaller aggregates of from about 10 nm to about 500 nm upon application of suitable energy.

Upon dry mixing the particulate conductive filler with the larger particulate polymer material with suitable energy, the smaller granules of conductive filler material can completely coat the larger polymer granules. For example, a single powder particle can be obtained following mixing of 8 wt % carbon black with 92 wt % UHMWPE. Therefore, the UHMWPE particles are completely coated with carbon black aggregates. While not wishing to be bound by any particular theory, it is believed that forces of mixing combined with electrostatic attractive forces between the non-conductive polymeric particles and the smaller conductive particles are primarily responsible for breaking the agglomerates of the conductive material down into smaller aggregates and forming and holding the coating layer of the conductive material on the polymer particles during formation of the composite powder as well as during later conversion of the powdered composite material into a solid form.

Following formation of the mixture comprising the conductive filler and the polymeric material, the mixture can be converted as desired to form a solid composite material. In one aspect, the solid composite material can be electrically conductive. The solid composite thus formed can also maintain the physical characteristics of the polymeric material in mixtures comprising a relatively low weight percentage of conductive filler. For example, in the aspect described above, in which the composite material includes a conductive filler mixed with UHMWPE, the powder can be converted via a compression molding process or a RAM extrusion process, as is generally known in the art.

In other aspects however, and primarily depending upon the nature of the polymeric portion of the composite, other conversion methods may preferably be employed. For example, in other aspects, the polymeric portion of the composite material can be a polymer, a co-polymer, or a mixture of polymers that can be suitable for other converting processes. For example and without limitation, the composite polymeric material can be converted via a conventional extrusion or injection molding process.

The composite material of the spaced conductive portions of the floor contact sensor system can optionally comprise other materials in addition to the primary polymeric component and the conductive filler discussed above. In one aspect, the composite material can comprise additional fillers, including, for example and without limitation, various ceramic fillers, aluminum oxide, zirconia, calcium, silicon, fibrous fillers, including carbon fibers and/or glass fibers, or any other fillers as are generally known in the art. In another aspect, the composite material can include an organic filler, including for example and without limitation, tetrafluoroethylene or a fluororesin.

It is believed that during the conversion process, the polymer particles can fuse together and confine the conductive filler particles to a three-dimensional channel network within the composite, forming a segregated network type of composite material. In operation, the distances between many of the individual carbon black primary particles and small aggregates is quite small, believed to be nearing 10 nm. It is contemplated that when two conductive filler particles are within about 10 nm of each other, they can conduct current via electron tunneling, or percolation, with very little resistance. Thus, many conductive paths fulfilling these conditions can be traced across the image. Moreover, as the polymers are deformable, the conductivity, and in particular the resistance, of the composite material of the contact sensors described herein can vary upon application of a compressive force (i.e., load) to the composite material.

Accordingly, following any desired molding, shaping, cutting and/or machining and also following any desired physical combination of the formed composite material with other non-conductive materials (various aspects of which are discussed further below), the composite materials of the spaced conductive portions of the floor contact sensor system described herein, which comprise at least one conductive filler, can be formed into the sensor shape and placed in electrical communication with the data acquisition terminal. For example, in one aspect, the composite material of the spaced conductive portions of the floor contact sensor system can be connected to a data acquisition terminal 100. In this aspect, the composite material can be connected to the data acquisition terminal by, for example and without limitation, conventional conductive vias, foils, wire, conductive epoxy, conductive silver ink, conventional rivet mechanisms, conventional crimping mechanisms, and other conventional mechanisms for maintaining electrical connections. In another aspect, the spaced conductive portions 36 of the floor contact sensor system can be machined to accept a connector of a predetermined geometry within the composite material itself. Other connection regimes as are generally known in the art may optionally be utilized, however, including fixed or unfixed connections to any suitable communication system between the spaced conductive portions of the floor contact sensor system and the data acquisition terminal. In particular, no particular electrical communication system is required of the contact sensors described herein. For example, in other aspects, the electrical communication between the spaced conductive portions of the floor contact sensor system and the data acquisition terminal can be wireless, rather than a hard wired connection.

In one aspect, the data acquisition terminal 100 can comprise data acquisition circuitry. In another aspect, the data acquisition terminal can comprise at least one multiplexer placed in electrical communication with a microcontroller via the data acquisition circuitry. In an additional aspect, the data acquisition circuitry can comprise at least one op-amp for providing a predetermined offset and gain through the circuitry. In this aspect, the at least one op-amp can comprise a converting op-amp configured to convert a current reading into a voltage output. It is contemplated that the converting op-amp can measure current after it has passed through the at least one multiplexer and then convert the measured current into a voltage output. In a further aspect, the data acquisition terminal 100 can comprise an Analog/Digital (A/D) converter. In this aspect, the A/D converter can be configured to receive the voltage output from the converting op-amp. It is contemplated that the A/D converter can convert the voltage output into a digital output signal. In yet another aspect, the data acquisition terminal can be in electrical communication with a computer having a processor. In this aspect, the computer can be configured to receive the digital output signal from the A/D converter. It is contemplated that the A/D converter can have a conventional Wi-Fi transmitter for wirelessly transmitting the digital output signal to the computer. It is further contemplated that the computer can have a conventional Wi-Fi receiver to receive the digital output signal from the A/D converter.

Figure 11:
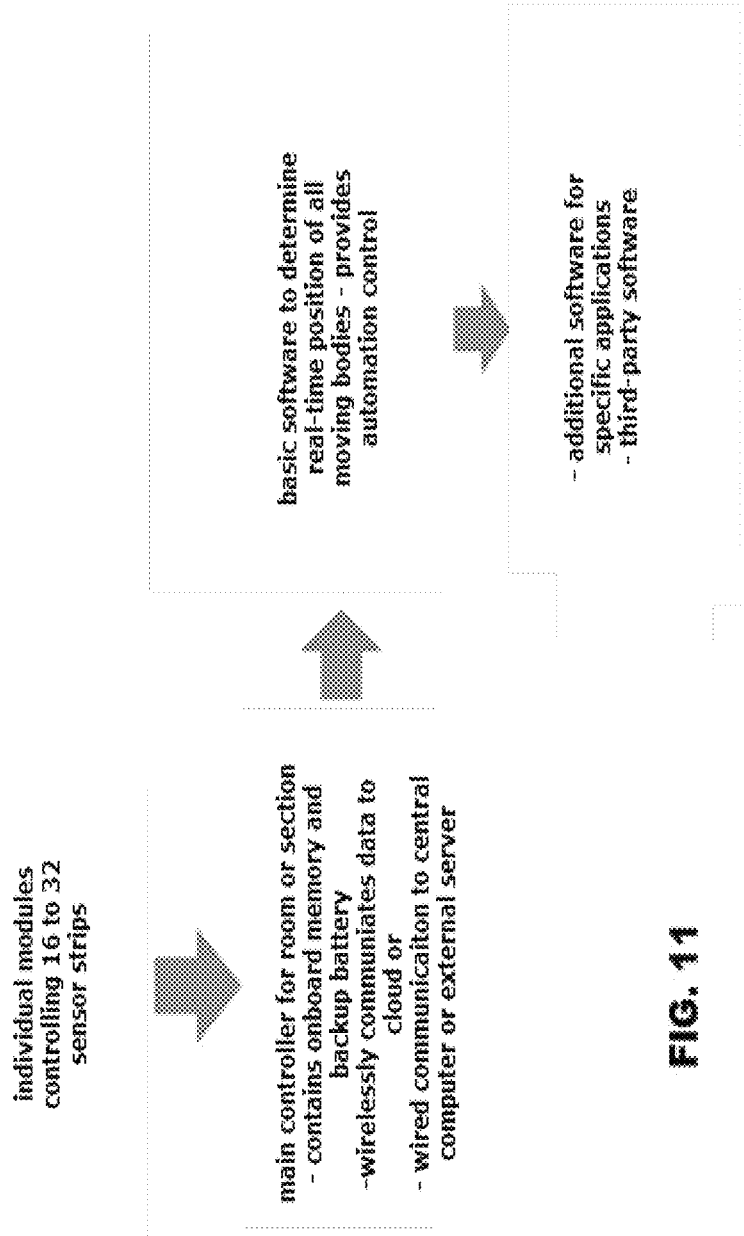
FIG. 11 illustrates a simplified, non-limiting block diagram showing select components of an exemplary operating environment for performing the disclosed methods.

As electrical communications methods and electrical data analysis methods and systems are generally known in the art, these particular aspects of the disclosed contact sensor systems are not described in great detail herein. FIGS. 10-11 are block diagrams illustrating exemplary operating environments for performing the disclosed methods and portions thereof. These exemplary operating environments are only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the system and method comprise, but are not limited to, personal computers, server computers, laptop devices, hand-held electronic devices, vehicle-embedded electronic devices, and multi-processor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. In one aspect, the program modules can comprise a system control module. The disclosed method can also be practiced in grid-based and distributed computing environments where tasks are performed by remote processing devices that are linked through a communications network. In a distributed computing environment, program modules can be located in both local and remote computer storage media including memory storage devices.

Figure 9:
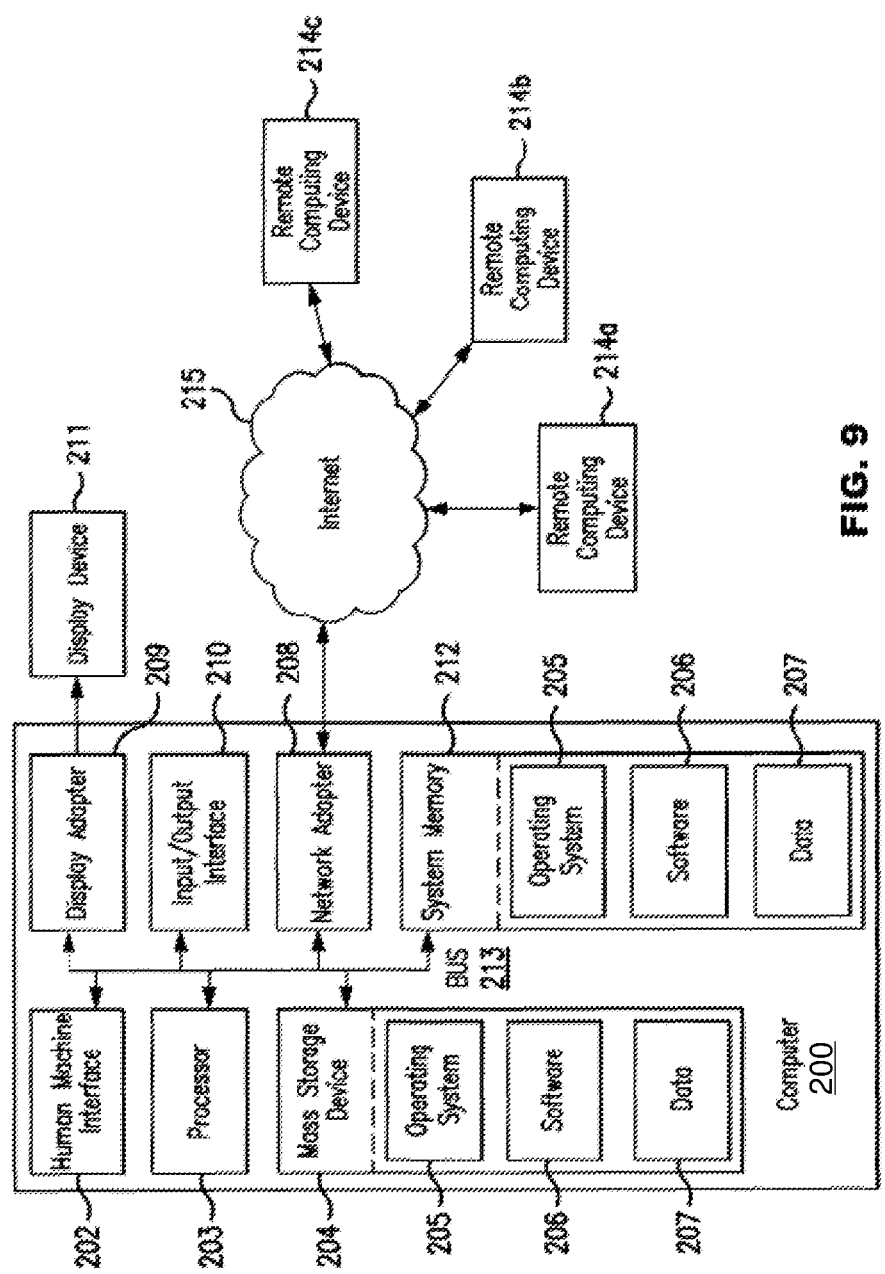
FIG. 9 illustrates a simplified, non-limiting block diagram showing select components of an exemplary operating environment for performing the disclosed methods.

Further, one skilled in the art will appreciate that the system and method disclosed herein can be implemented via a general-purpose computing device in the form of a computer 200. As schematically illustrated in FIG. 9, the components of the computer 200 can comprise, but are not limited to, one or more processors or processing units 203, a system memory 212, and a system bus 213 that couples various system components including the processor 203 to the system memory 212.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 213, and all buses specified in this description can also be implemented over a wired or wireless network connection and each of the subsystems, including the processor 203, a mass storage device 204, an operating system 205, contact sensor software 206, contact sensor data 207, a network adapter 208, system memory 212, an Input/Output Interface 210, a display adapter 209, a display device 211, and a human machine interface 202, can be contained within one or more remote computing devices 214*a,b,c* at physically separate locations, connected through buses of this form, in effect implementing a fully distributed system.

The computer 200 typically comprises a variety of computer readable media. Exemplary readable media can be any available media that is accessible by the computer 200 and comprises, for example and not meant to be limiting, both volatile and non-volatile media, removable and non-removable media. The system memory 212 can comprise computer readable media in the form of volatile memory, such as random access memory (RAM), and/or non-volatile memory, such as read only memory (ROM). The system memory 212 typically contains data such as pressure and/or hysteresis data 207 and/or program modules such as operating system 205 and contact sensor module software 206 that are immediately accessible to and/or are presently operated on by the processing unit 203.

Figure 8:
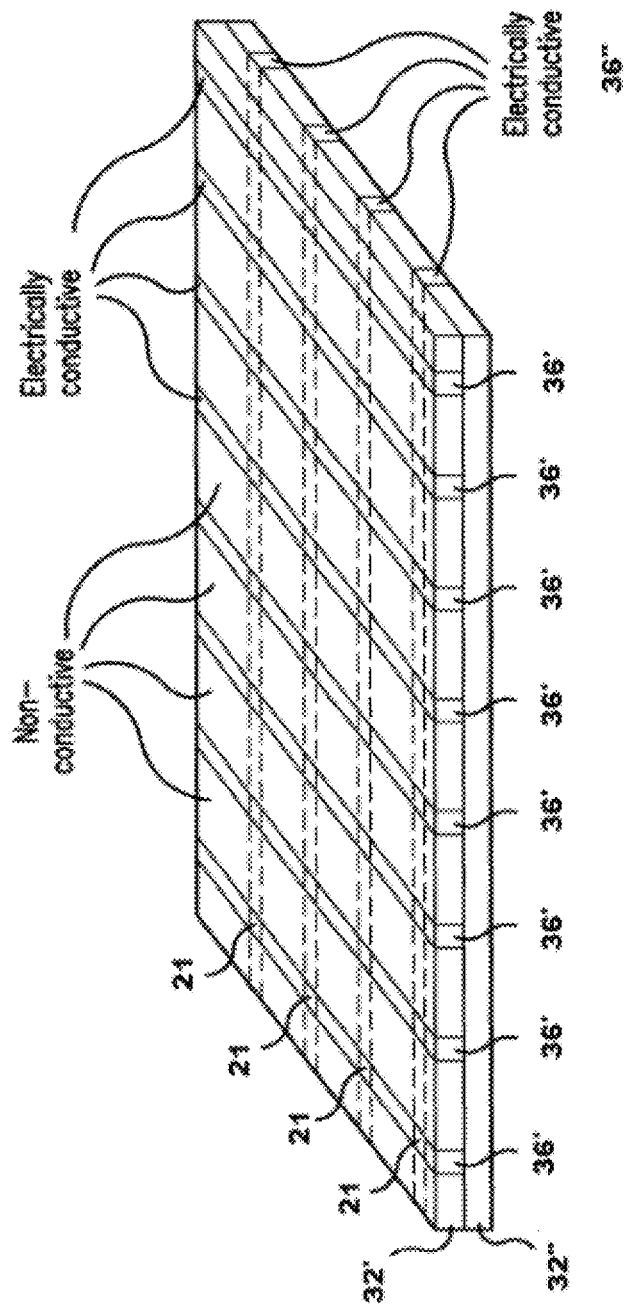
FIG. 8 is a perspective partially transparent view showing one aspect of a floor contact sensor system disclosed herein for obtaining pressure data of a junction, the floor contact sensor system showing two stacked sensor sheets, each sheet having a plurality of spaced conductive portions, the stacked sensor sheets being oriented substantially perpendicular to each other such that an array of sensing points is formed by the overlapping portions of the conductive portions of the stacked sensor sheets.

In another aspect, the computer 200 can also comprise other removable/non-removable, volatile/non-volatile computer storage media. By way of example, FIG. 8 illustrates a mass storage device 204 which can provide non-volatile storage of computer code, computer readable instructions, data structures, program modules, and other data for the computer 200. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and contact sensor module software 206. Each of the operating system 205 and contact sensor module software 206 (or some combination thereof) can comprise elements of the programming and the load cell module software 206. Pressure and/or hysteresis data 207 can also be stored on the mass storage device 204.

Pressure and/or hysteresis data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 200 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 200 can have more than one display adapter 209 and the computer 200 can have more than one display device 211. For example, a display device can be a monitor, an LCD (Liquid Crystal Display), or a projector. In addition to the display device 211, other output peripheral devices can comprise components such as a printer (not shown) which can be connected to the computer 200 via Input/Output Interface 210.

The computer 200 can operate in a networked environment using logical connections to one or more remote computing devices 214*a,b,c*. By way of example, a remote computing device can be a personal computer, portable computer, a server, a router, a network computer, a peer device or other common network node, and so on. Logical connections between the computer 200 and a remote computing device 214*a,b,c* can be made via a local area network (LAN) and a general wide area network (WAN). Such network connections can be through a network adapter 208. A network adapter 208 can be implemented in both wired and wireless environments. Such networking environments are conventional and commonplace in offices, enterprise-wide computer networks, intranets, and the Internet 215.

For purposes of illustration, application programs and other executable program components such as the operating system 205 are illustrated herein as discrete blocks, although it is recognized that such programs and components reside at various times in different storage components of the computing device 200, and are executed by the data processor(s) of the computer. An implementation of contact sensor software 206 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In various aspects, it is contemplated that the methods and systems described herein can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

In one aspect, each sensing point 21 can be measured multiple times each second to be able to detect a desired degree of fidelity with respect to object movement and determine the direction of the objects. Because the sensing points 21 are formed at the intersections of the bottom and top substrate conductive portions, each individual sensing point is addressable by selecting the specific bottom layer conductive portion and the specific top layer conductive portion.

In another aspect, it is contemplated that all of the conductive portions 36 can be scanned sequentially, by one controller unit, or the room can be divided into sections and each section can be can be sequentially scanned, allowing multiple sections to be scanning in parallel, which can allow for faster collection of the data and also allow for a modular approach to be used to make installation easier. In one exemplary aspect, a MCU with either a high pin count or controlling a group of analog multiplexers can be used to control groups of 16 to 32 conductive portions. This aspect can allow for connection modules to be pre-configured prior to installation and allow a simple plug-and-play experience for the installer. Further, in this aspect, a conventional communications bus, such as, for example and without limitation, a USB 2.0, a CAN similar protocol, can be used for communication between each module's MCU and the main controller. In one aspect, the main controller of the data acquisition terminal can be on a per-room or per-building basis, depending on the specific configuration. In this aspect, the main controller of the data acquisition terminal will preferably communicate the data wirelessly to the cloud or communicate the data via a wired connection to a central computer that further controls the building.

The main controller chip can also contain a battery for backup power and memory to store data in case connection to the central computer or cloud server is lost. The duration of battery and memory backup may vary depending on application, but it is contemplated that backup battery power along with sufficient memory can be provided for 24 hours of operation after a power failure. This could be especially important in security applications where there is concern that an intruder might cut the grid power in an attempt to disable the security system. Non-volatile memory could be used, such that when the backup battery dies, all sensor information written to memory will be retained, and can be recovered once power is restored. Optionally, it is contemplated that a backup wireless radio that uses long-range communications, such as cellular data, could also be included onboard the main controller board to allow for continuous transmission of sensor data during a power outage.

Optionally, in addition to the electronics methods already discussed, shift registers can also be used to control the voltage applied to the conductor strips of one side of the sensor junctions. In this aspect, a shift register with a 3-state output register can be wired to apply voltage to each of its outputs in a successive manner, given the appropriate digital input. This can allow voltage to be successively applied to each conductor strip on the bottom of the sensor sheet as the current flowing through each conductor strip is measured by an analog-to-digital converter. Because of the low cost of shift registers, instead of connecting the rows of multiple rolls together, each roll can have its rows controlled by shift registers being fed the same digital input and multiple rolls can be scanned as one without having to connect the rows of each roll.

In a further aspect, the row-controlling electronics are useful if supplying the finished product as a roll of flooring underlayment with pre-connected and integrated electronics, since the length direction of each roll contains the majority of scanning lines. The use of a shift register allows for the design of a row controlling modular connection approach. For example, a shift register that controls 8 rows can be married to the flexible row connection harness/circuit to create a repeatable modular unit that allows for simplified manufacturing. The flexible row connection harness/circuit can be made using Flat Flexible Circuit (FFC), Flat Printed Cable (FPC), Flexible Printed Wiring (FPW), or many other technologies.

It is also contemplated to combine the flexible row connection harness/circuit with the conductive row strips, making a single piece of material that contains both the conductive strips and the circuitry to connect them to the electronics, thereby eliminating the need for a secondary process to electrically connect the electronics to the conductive strips. Exemplary methodologies, and without limitation, to accomplish these manufacturing tasks include: using conductive inks that can be printed by a screen-printing process, a continuous transfer printing process, or digitally ink-jet printed. With an ink-jet printer of appropriate width, the conductive strips as well as the wiring connecting the conductive strips to the electronics can all be digitally printed in one pass in a continuous process on a polymer media that can also serve the function of the outer layer of the underlayment.

In operation, it is further contemplated that the floor sensor system can be configured to detect the presence, exact location, movement, and direction of movement of people, animals, and objects on any floor containing the floor sensor system. Software will be deployed to take the sensor readings and automate certain tasks based on the readings and provide information on the readings in a graphical and meaningful context. In optional aspects, it is contemplated that the software can comprise software directed to viewing real-time position and movement of people, animals, objects, etc. on a digital replication of the floor plan, and to processing the data and automating building tasks based on the data (such as turning lights on/off, adjusting thermostats, controlling elevators, etc.). In this aspect, the software may require a user interface, but it is contemplated that the user interface for the auto-controlling part of the software can be configured to be used only for setting preferences for the control parameters, such as thermostat settings based on number of people detected, how long to wait to turn off lights when a room is left, whether to turn lights of all rooms near a person's position in a hallway, and other similar types of settings.

In one aspect, the graphical display of the real-time viewing software can be configured to show a digital floor plan of all rooms and building spaces, exterior environments, boats, busses, trucks etc. that contain flooring with the sensor system under it. In another aspect, the viewing software can also be configured to display historical data as color-coded or sized dots on the digital floor plan. Optionally, 3D images of the detected person, animal, or object can also be displayed. If, for example, it is desired to monitor access to certain rooms or spaces of a building, the viewing software can show a floor plan of the room with a larger dot showing the entry and exit points, and smaller dots showing the path of travel throughout the room or space. In this exemplary aspect, hovering the mouse cursor over any point could show the timestamp when the person, animal, or object was at that physical point. Similarly, a play, pause, forward, reverse control could be used to show the travel path of a person through a room or the travel paths of multiple people throughout a building.

In another aspect, when multiple people are detected, the system is capable of tracking the movement of all the different people, but the data may only indicate that there is a moving weight. In one aspect, while the data may not provide the identity of an individual person, it is contemplated that individual moving weights can be distinguishable not only by the continuous monitoring of their position, but also by the specific analog value being recorded as the weight—this redundancy can prove useful in situations where multiple bodies are being tracked and two come in close enough proximity where the same sensing point(s)n might be detecting portions of the weight of both bodies.

In one exemplary use of the floor sensor system, if a store manager wants to know if a certain display is getting noticed, the floor sensor system can provide detailed information with respect to traffic flow and with respect to how many people paused to look at the display compared to how many did not. Additionally, floor sensor system can suggest the most heavily trafficked areas of a building for placing product items to enhance the marketability of the placed goods. In another aspect, the floor sensor system can be configured for security. In this aspect, the floor sensor system can show the paths of night watchmen and any potential detections of people where they should not be during certain hours, with the ability to give real-time alerts to security personnel, showing them the real-time movements of the intruding body on the digital floor plan as they are en-route. In another aspect, the floor sensor system can be configured operation of elevators that will enable the elevators to be operated most efficiently, and able to predict which floor to go to prior to someone pressing the up or down button calling the elevator to a particular floor. In general, it is contemplated that the In another aspect, the floor sensor system can be configured to optimize traffic flow throughout buildings and increase the efficiency of machinery, and any other specific software that allows this will be provided as the application dictates.

In a further exemplary use, the floor sensor system can be incorporated into floor mats. In this aspect, it is contemplated that the sensor floor mats would be able to determine the direction of traffic flow over their surface, the number of people and times at which they crossed the mat, and even the relative size of people or objects that crossed the mat (based on weight). For longer mats, or runners, how many people are on the mat, their entry and exit times, and the duration of time they spent on the mat can also be determined (for example, in waiting lines and store checkout lanes), fall detection etc. etc. In a further aspect, this information can simply be collected for research and insight purposes or immediately sent to analytics software that can trigger real-time alerts to appropriate personnel.

In is contemplated that the floor sensor system for floor mates would be communicate wirelessly. With appropriate programming, WiFi modules can be incorporated into the floor mate to electrically couple to the integrated floor sensor system. Such WiFi modules draw very little power and still allow the sensor floor mat to connect directly to the internet. Optionally, Bluetooth Smart, a low-energy protocol contained in the specification of Bluetooth 4.0 and beyond, can be used while requiring significantly lower power levels that can be generated from energy harvesting techniques, such as solar and piezoelectric. In another optional aspect, the sensor floor mats can contain battery power (either replaceable or rechargeable) to allow uninterrupted functioning for weeks, months, or even years.

These and other modifications and variations to the present invention may be practiced by those of ordinary skill in the art, without departing from the spirit and scope of the present invention, which is more particularly set forth in the appended claims. In addition, it should be understood that aspects of the various aspects may be interchanged either in whole or in part. Furthermore, those of ordinary skill in the art will appreciate that the foregoing description is by way of example only, and is not intended to limit the invention so further described in such appended claims. Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A floor contact sensor system, comprising:
   a data acquisition terminal;
   a sensor sheet assembly comprising a pair of opposed sensor sheets, each sensor sheet comprising a base sheet and selected spaced conductive portions extending upwardly therefrom, wherein each spaced conductive portion is in communication with the data acquisition terminal, wherein the pair of sensor sheets comprises an upper sensor sheet and a lower sensor sheet that are stacked vertically in opposition such that the respective base sheets of the pair of sensor sheets form a bottom surface and an upper surface and that portions of the opposed conductive portions in the sensor sheets overlap and create an array of sensing points at the overlapping and opposed conductive portions of the stacked sensor sheets, wherein the conductive portions of each sensor sheet form parallel conductive stripes extending the length of the base sheet, and wherein the base sheet and the conductive portions of each sensor sheet define a plurality of troughs extending the length of the base sheet, the floor contact sensor system further comprising at least one elongate tube mounted in the plurality of troughs of a select sensor sheet along a serpentine path; and
   means for determining the pressure applied at least one sensing point of the array of sensing points, wherein each conductive portion of each sensor sheet is formed from a pressure sensitive conductive composite material that comprises an electrically conductive filler and a polymeric material.

2. The floor contact sensor system of claim 1, wherein the conductive parallel stripes of one sensor sheet are oriented perpendicular to the conductive portions of an adjacent sensor sheet.

3. The floor contact sensor system of claim 2, wherein the data acquisition terminal is programmed to selectively connect one conductive stripe of an underlying lower sensor sheet to a voltage source and one conductive stripe of the overlying upper sensor sheet to a current-to-voltage circuit to measure the current through the sensing point formed at the overlapping portions of the stacked sensor sheets.

4. The floor contact sensor system of claim 3, wherein the data acquisition terminal is programmed to measure the current at each sensing point of the array of sensing points.

5. The floor contact sensor system of claim 3, wherein the data acquisition terminal is programmed to process the current measurements of at least one sensing point to determine the pressure that is applied at each sensing point.

6. The floor contact sensor system of claim 1, wherein each base sheet is moisture impervious.

7. The floor contact sensor system of claim 6, wherein each base sheet comprises a hydrophobic material.

8. The floor contact sensor system of claim 1, wherein the base sheet is integrally formed with the selected spaced conductive portions.

9. The floor contact sensor system of claim 1, further comprising a flooring material having a lower surface that is configured to be mounted on the upper surface of the upper sensor sheet, wherein the means for determining the pressure applied at least one sensing point of the array of sensing points is configured to sense pressure applied to an upper surface of the flooring material.

10. The floor contact sensor system of claim 1, further comprising a source of pressurized fluid in fluid communication with the elongate tube, and wherein the data acquisition terminal is programmed to regulate a recirculation rate and the temperature of the pressurized fluid supplied to the tube.

11. The floor contact sensor system of claim 1, wherein the selected spaced conductive portions of each sensor sheet are formed from an inflexible composite material.

12. The floor contact sensor system of claim 1, wherein the base sheet of each sensor sheet is formed from a non-conductive polymeric material.

13. The floor contact sensor system of claim 12, wherein the polymeric material is a thermoformable polymer.

14. The floor contact sensor system of claim 1, wherein the polymeric material is selected from a group consisting of: ultra-high molecular weight polyethylene (UHMWPE), high density polyethylene (HDPE), polyphenolyne sulfide (PPS), low density polyethylene (LDPE), or polyoxymethylene copolymer (POM).

15. The floor contact sensor system of claim 1, wherein a desired amount of conductive filler can range from 0.1% to 20% by weight of the pressure sensitive composite material.

16. The floor contact sensor system of claim 1, wherein a desired amount of conductive filler can range from 1% to 15% by weight of the pressure sensitive composite material.

17. The contact sensor system of claim 1, wherein a desired amount of conductive filler can range from 5% to 12% by weight of the pressure sensitive composite material.

18. The floor contact sensor system of claim 1, wherein the conductive filler comprises carbon black.

19. The floor contact sensor system of claim 1, wherein the pressure sensitive composite material further comprises ceramic fillers, aluminum oxide, zirconia, calcium, silicon, fibrous fillers, carbon fibers, glass fibers, and/or organic fillers.

20. A floor contact sensor system, comprising:
a flooring material having an upper surface and a lower surface;
a data acquisition terminal;
a sensor sheet assembly comprising a pair of opposed sensor sheets, each sensor sheet comprising a base sheet and selected spaced conductive portions extending upwardly therefrom, wherein each spaced conductive portion is in communication with the data acquisition terminal, wherein the pair of sensor sheets comprises an upper sensor sheet and a lower sensor sheet that are stacked vertically in opposition such that the respective base sheets of the pair of sensor sheets form a bottom surface and an upper surface and that portions of the opposed conductive portions in the sensor sheets overlap and create an array of sensing points at the overlapping and opposed conductive portions of the stacked sensor sheets, wherein each spaced conductive portion is in communication with the data acquisition terminal, wherein the selected spaced conductive portions are formed from an inflexible composite material, wherein at least a portion of the lower surface of the flooring material underlies and is in contact with at least a portion of the upper surface of the overlying upper sensor sheet, and wherein the base sheet and the conductive portions of each sensor sheet define a plurality of troughs extending the length of the base sheet, further comprising at least one elongate tube mounted in the plurality of troughs of a select sensor sheet along a serpentine path; and
means for determining the pressure applied at least one sensing point of the array of sensing points to sense pressure applied to an upper surface of the flooring material.

21. The floor contact sensor system of claim 20, wherein the conductive portions of each sensor sheet form conductive stripes extending the length of the base sheet.

22. The floor contact sensor system of claim 20, wherein the conductive parallel stripes of one sensor sheet are oriented perpendicular to the conductive portions of an adjacent sensor sheet.

23. The floor contact sensor system of claim 20, wherein the data acquisition terminal is programmed to selectively connect one conductive stripe of an underlying lower sensor sheet to a voltage source and one conductive stripe of the overlying upper sensor sheet to a current-to-voltage circuit to measure the current through the sensing point formed at the overlapping portions of the stacked sensor sheets, and wherein the data acquisition terminal is programmed to measure the current at each sensing point of the array of sensing points.

24. The floor contact sensor system of claim 23, wherein the data acquisition terminal is programmed to process the current measurements at least one sensing point to determine the pressure that is applied at each sensing point.

25. The floor contact sensor system of claim 20, further comprising a source of pressurized fluid in fluid communication with the elongate tube, and wherein the data acquisition terminal is programmed to regulate a recirculation rate and the temperature of the pressurized fluid supplied to the tube.

* * * * *